US005556356A

United States Patent [19]
Hakamada et al.

[11] Patent Number: 5,556,356
[45] Date of Patent: Sep. 17, 1996

[54] HYDRAULIC CONTROL SYSTEM FOR AN AUTOMATIC TRANSMISSION OF A VEHICLE

[75] Inventors: Naoki Hakamada; Mitsuo Inagaki, both of Okazaki; Yoriaki Ando, Nagoya; Kunihiro Kubo, Nishio, all of Japan

[73] Assignee: Nippon Soken, Inc., Nishio, Japan

[21] Appl. No.: 344,579

[22] Filed: Nov. 18, 1994

[30] Foreign Application Priority Data

Nov. 19, 1993 [JP] Japan .................................. 5-290871

[51] Int. Cl.$^6$ ................................................. F16H 61/26
[52] U.S. Cl. ........................... 477/163; 477/130; 477/143
[58] Field of Search ................................... 475/120, 127, 475/128; 477/130, 143, 158, 163

[56] References Cited

U.S. PATENT DOCUMENTS

| | | | |
|---|---|---|---|
| 5,010,786 | 4/1991 | Hiramatsu et al. | 477/134 |
| 5,024,125 | 6/1991 | Baba | 477/163 |
| 5,042,328 | 8/1991 | Morishige et al. | 477/163 |
| 5,085,103 | 2/1992 | Ando et al. | |

Primary Examiner—Charles A. Marmor
Assistant Examiner—Sherry Lynn Estremsky
Attorney, Agent, or Firm—Cushman Darby & Cushman, L.L.P.

[57] ABSTRACT

A hydraulic control system for an automatic transmission of automotive vehicles is provided. The hydraulic control system includes a pressure source, a plurality of solenoid valves, and a plurality of directional control valves. Each solenoid valve selectively supplies and release hydraulic pressure to and from one of frictional element of a power train of the automatic transmission according to a given schedule of transmission operation for establishing a given gear ratio. The directional control valves are interposed between the frictional elements of the power train and the solenoid valves, respectively. Each of the directional control valves is responsive to input of the hydraulic pressure supplied from the pressure source through a preselected hydraulic line to assume first and second valve positions, the first valve position being to allow the hydraulic pressure to be directed to one of the frictional elements, the second valve position being to release the hydraulic pressure acting on one of the frictional element. Additionally, the hydraulic pressure to activate the frictional elements is reduced in pressure level temporarily upon supply thereto for absorbing mechanical shock caused by engagement of the frictional elements.

3 Claims, 17 Drawing Sheets

FIG. 4

TABLE 1

| SHIFT POSITION | | C1 | C2 | B0 | B1 | B2 | B3 | C0 |
|---|---|---|---|---|---|---|---|---|
| P | | | | | | | | ○ |
| R | | | ○ | | | | ○ | ○ |
| N | | | | | | | | ○ |
| D | O/D | ○ | ○ | ○ | | ○ | | |
| | 3rd | ○ | ○ | | | ○ | | ○ |
| | 2nd | ○ | | | | ○ | | ○ |
| | 1st | ○ | | | | | | ○ |
| II | 3rd | ○ | ○ | | | ○ | | ○ |
| | 2nd | ○ | | | ○ | ○ | | ○ |
| | 1st | ○ | | | | | | ○ |
| L | 2nd | ○ | | | ○ | ○ | | ○ |
| | 1st | ○ | | | | | ○ | ○ |

○: ENGAGEMENT BY PRESSURE SUPPLY

HYDRAULIC CONTROL SYSTEM FOR AN AUTOMATIC TRANSMISSION OF A VEHICLE

BACKGROUND OF THE INVENTION

1. Technical Field of the Invention

The present invention relates generally to a hydraulic control system for an automatic transmission of an automotive vehicle, and more particularly to an improved hydraulic control system which is so designed as to absorb mechanical shifting shocks effectively, caused by engagement operations of clutches and brakes of an automatic transmission, without use of shock-absorbing accumulators.

2. Background Art

Reference will be made to FIG. 18 to describe a structure of a conventional automatic transmission system.

The shown automatic transmission system includes generally a power train 200 and a hydraulic control system 300. The hydraulic control system 300 includes an oil strainer 151, an oil pump 152, a primary regulator valve 153, a secondary regulator valve 154, a pressure relief valve 155, a throttle modulator valve 156, a first accumulator control valve 157, a second accumulator control valve 158, a down-shift plug 159, a throttle valve 160, a cutback valve 161, a lock-up solenoid 162, a lock-up relay valve 163, a cooler by-pass valve 164, an oil cooler 165, an 1-2 shift valve 166, a 2-3 shift valve 167, a 3-4 shift valve 168, a low coast modulator valve 169, a second coast modulator valve 170, a B1 orifice control valve 171, a second lock valve 172, a first solenoid 173, a second solenoid 174, and a manual valve 175.

The automatic transmission system further includes five hydraulic dampers or accumulators: a C1 accumulator 176, a C2 accumulator 177, a B2 accumulator 178, a C0 accumulator 179, and a B0 accumulator 180 for absorbing uncomfortable mechanical shocks caused by engagement of clutches and brakes of the power train 200.

The power train 200, as shown in FIG. 3, includes three clutches: an overdrive clutch C0, a forward clutch C1, and a direct clutch C2 and four brakes: an overdrive brake B0, a second coast brake B1, a second brake B2, and a first and reverse brake B3.

The overdrive clutch C0 is responsive to hydraulic pressure supplied to its actuator (not shown) to engage a carrier 182 of an overdrive planetary gear set 181 with its sun gear 183. The forward clutch C1 serves to engage an input shaft 184 with a ring gear 186 of a front planetary gear set 185. The direct clutch C2 engages the input shaft 184 with a sun gear 187 of the front planetary gear set 185. The sun gear 187 extends into a rear planetary gear set 188 to work as a sun gear thereof.

The overdrive brake B0 is responsive to hydraulic pressure applied to its actuator (not shown) to engage the sun gear 183 of the overdrive planetary gear set 181 with a stationary transmission casing 189 for locking rotation of the sun gear 183. The second coast brake B1 locks the common sun gear 187. The second brake B2 locks rotation of an outer race (not shown) of a one-way clutch F1. The first and reverse brake B3 locks rotation of a carrier 190 of the rear planetary gear set 188. An intermediate shaft 191 is arranged to connect a carrier 192 of the front planetary gear set 185 with the carrier 182 of the overdrive planetary gear set 181.

The power train 200 uses three one-way clutches F0, F1, and F2. The clutch F0 is called an overdrive one-way clutch which restricts a counterclockwise rotation of the carrier 182 relative to the sun gear 183 of the overdrive planetary gear set 181. The clutch F1 restricts a counterclockwise rotation of the common sun gear 187 upon activation of the second brake B2. The clutch F2 serves to lock a counterclockwise rotation of the carrier 190 of the rear planetary gear 188. The power train 200 further includes a counter drive gear 193, a torque converter TC, and a lock-up clutch LC.

The above mentioned conventional automatic transmission system includes, as can be seen in FIG. 18, in the hydraulic control system mechanical directional control valves such as the solenoid valves 173 and 174 which serve as pilot valves. In addition, the hydraulic pressure supplied from the oil pump is regulated only by mechanical valves such as the pressure regulator valves 153 and 154. The engagement of the lock-up clutch LC for direct connection between a pump and a turbine of the torque converter is achieved by use of a mechanical spool valve such as the lock-up relay valve 163 controlled by the solenoid valve 162 working as a pilot valve. Further, the accumulators 176 to 180 and the accumulator control valves 157 and 158 are arranged in the hydraulic circuit to reduce mechanical shocks upon engagement of the clutches and the brakes. These arrangements, as also apparent from the drawing, make the hydraulic control system complex and bulky, causing the whole transmission system to become heavy as well as leading to the increase in manufacturing cost.

SUMMARY OF THE INVENTION

It is therefore a principal object of the present invention to avoid the disadvantages of the prior art.

It is another object of the present invention to provide an improved hydraulic control system for an automatic transmission which is designed to absorb mechanical shifting shocks effectively, caused by engagement and disengagement operations of clutches and brakes, without use of shock-.absorbing accumulators.

It is a further object of the invention to provide a simple hydraulic control system for an automatic transmission which can be manufactured at economic cost levels.

According to one aspect of the present invention, there is provided a hydraulic control system for an automatic transmission of a vehicle which includes a power train having a plurality of frictional elements which are selectively brought into engagement and disengagement on input of hydraulic pressure according to a given operation schedule for establishing a preselected gear ratio, which comprises a pressure source for providing the hydraulic pressure at a given level, a hydraulic circuit arranged to connect between the pressure source and the plurality of the frictional elements, a plurality of solenoid valves, a plurality of directional control valves, and a valve controlling means. The solenoid valves are disposed in the hydraulic circuit and have pressure input, pressure output, and pressure drain ports, respectively. Each of the solenoid valves assumes first and second valve positions, the first valve position being to establish fluid communication between the pressure input and pressure output ports to output from the pressure output port the hydraulic pressure supplied to the pressure input port from the pressure source, the second valve position being to establish fluid communication between the pressure output port and the pressure drain port. The directional control valves are interposed between the frictional elements and the solenoid valves, respectively. Each of the directional control valves is responsive to input of the hydraulic pressure supplied from the pressure source through a preselected hydraulic line to assume first and second valve positions, the first valve position being to establish fluid communication between one of the frictional elements and one of the pressure output ports of the solenoid valves, the second valve position being to release the hydraulic pressure acting on the one of the frictional element. The valve controlling means controls each of the solenoid valves to assume one of the first and second valve positions according to the given operation schedule for selectively establishing the engagement and disengagement of the frictional elements to provide the preselected gear ratio.

In the preferred mode, a pressure regulator means may be further provided for reducing the input hydraulic pressure to the frictional elements to a preselected lower level for a given period of time upon engagement of the frictional elements.

The pressure regulator means includes a pressure regulator valve and a solenoid valve. The pressure regulator valve is responsive to a preselected input pressure to regulate the hydraulic pressure provided by the pressure source to the given level. The solenoid valve modifies the preselected input pressure to reduce the input hydraulic pressure to the frictional elements to the preselected lower level for the given period of time upon the engagement of the frictional elements.

At least one of the directional control valves is responsive to the hydraulic pressure supplied through one of the solenoid valves to assume one of the first and second valve positions.

According to another aspect of the invention, there is provided a hydraulic control system for an automatic transmission of a vehicle which includes a power train having a plurality of frictional elements which are selectively brought into engagement and disengagement on input of hydraulic pressure according to a given operation schedule for establishing a preselected gear ratio, which comprises a pressure source for providing hydraulic pressure at a given level, a hydraulic circuit arranged to connect between the pressure source and the frictional elements, a plurality of solenoid valves, at least one directional control valve, and a valve controlling means. The solenoid valves are disposed in the hydraulic circuit and have pressure input, pressure output, and pressure drain ports, respectively. Each of the solenoid valves assumes first and second valve positions, the first valve position being to establish fluid communication between the pressure input and pressure output ports to output from the pressure output port the hydraulic pressure supplied to the pressure input port from the pressure source, the second valve position being to establish fluid communication between the pressure output port and the pressure drain port. The at least one directional control valve is disposed in the hydraulic circuit and assumes first and second valve positions, the first valve position being to supply the hydraulic pressure to one of the frictional elements while releasing the hydraulic pressure of the other one of the frictional elements, the second valve position being to release the hydraulic pressure in the one of the frictional elements while supplying the hydraulic pressure to the other one of the frictional element. The valve controlling means controls each of the solenoid valves to assume one of the first and second valve positions according to the given operation schedule for selectively establishing the engagement and disengagement of the frictional elements to provide the preselected gear ratio.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings:

FIG. 4 is a block diagram which shows an automatic transmission system having a hydraulic control system according to the present invention;

FIG. 4 is a table 1 which represents operative relations between positions of a shift lever among the P, R, N, D, II, and L ranges and operative conditions of clutches and brakes of a power train;

DESCRIPTION OF THE PREFERRED EMBODIMENT

Figure 1:
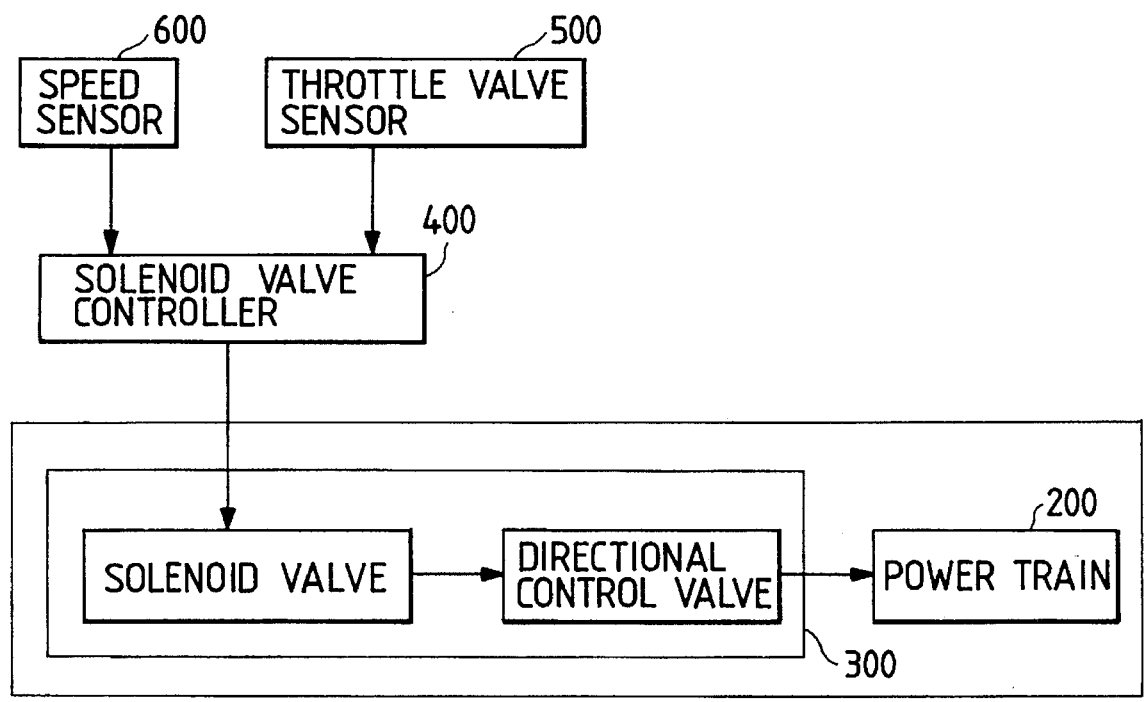

Referring now to the drawings, wherein like numbers refer to like parts in several views, particularly to FIG. 1, there is shown an automatic transmission system 1 for automotive vehicles which includes generally a power train 200 and a hydraulic control system 300. The power train 200, as will be explained in detail, includes a plurality of frictional elements such as clutches and brakes which are constructed to engage and disengage upon supply and release of hydraulic pressure. The hydraulic control system 300 is responsive to a control signal from a solenoid valve controller 400 to selectively supply and release hydraulic pressure to and from the power train 200 according to a given schedule based on a throttle valve opening degree and a vehicle speed monitored by a throttle valve sensor 500 and a speed sensor 600.

Figure 2:
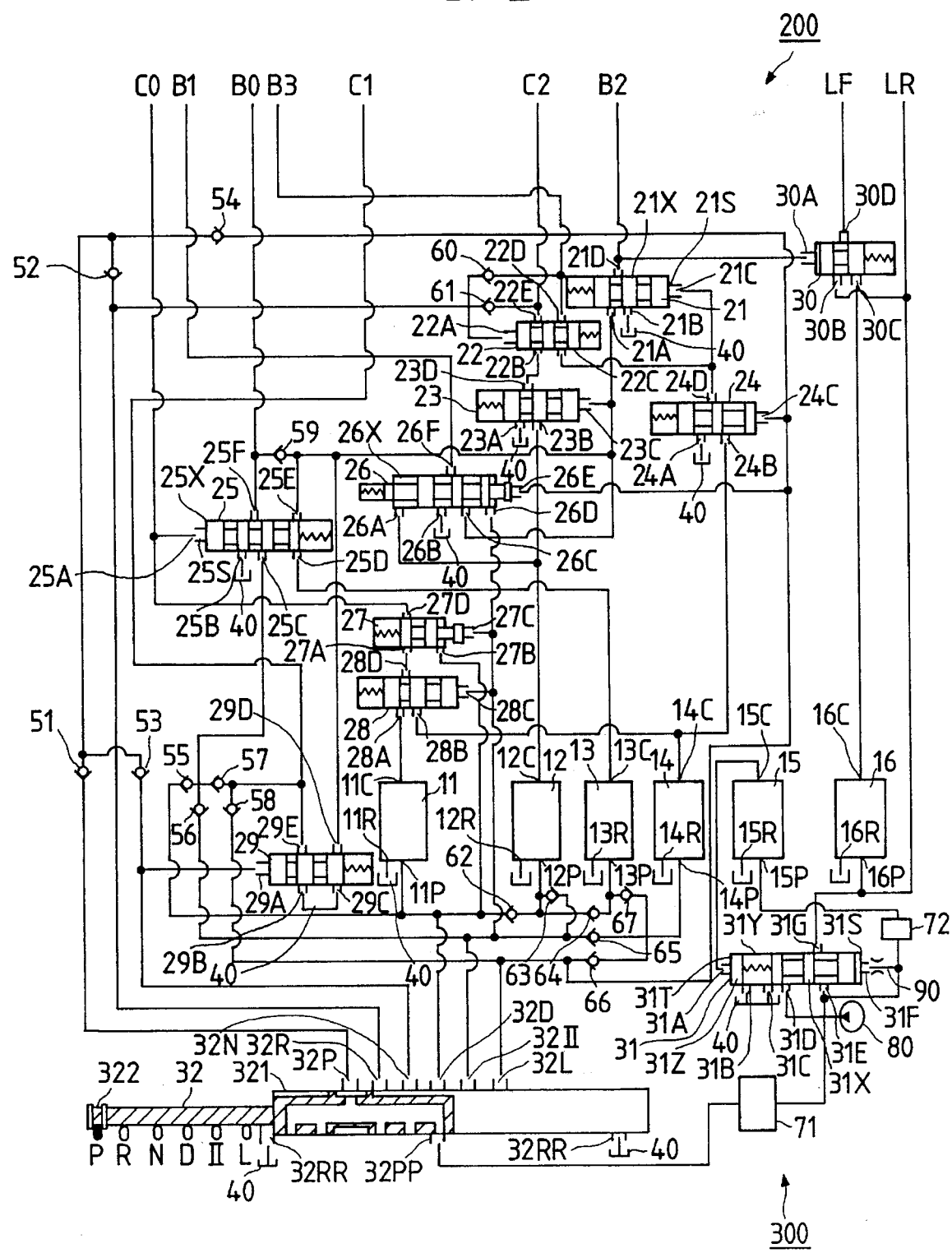
FIG. 2 is a hydraulic circuit diagram which shows a hydraulic control system for an automatic transmission.
Figure 3:
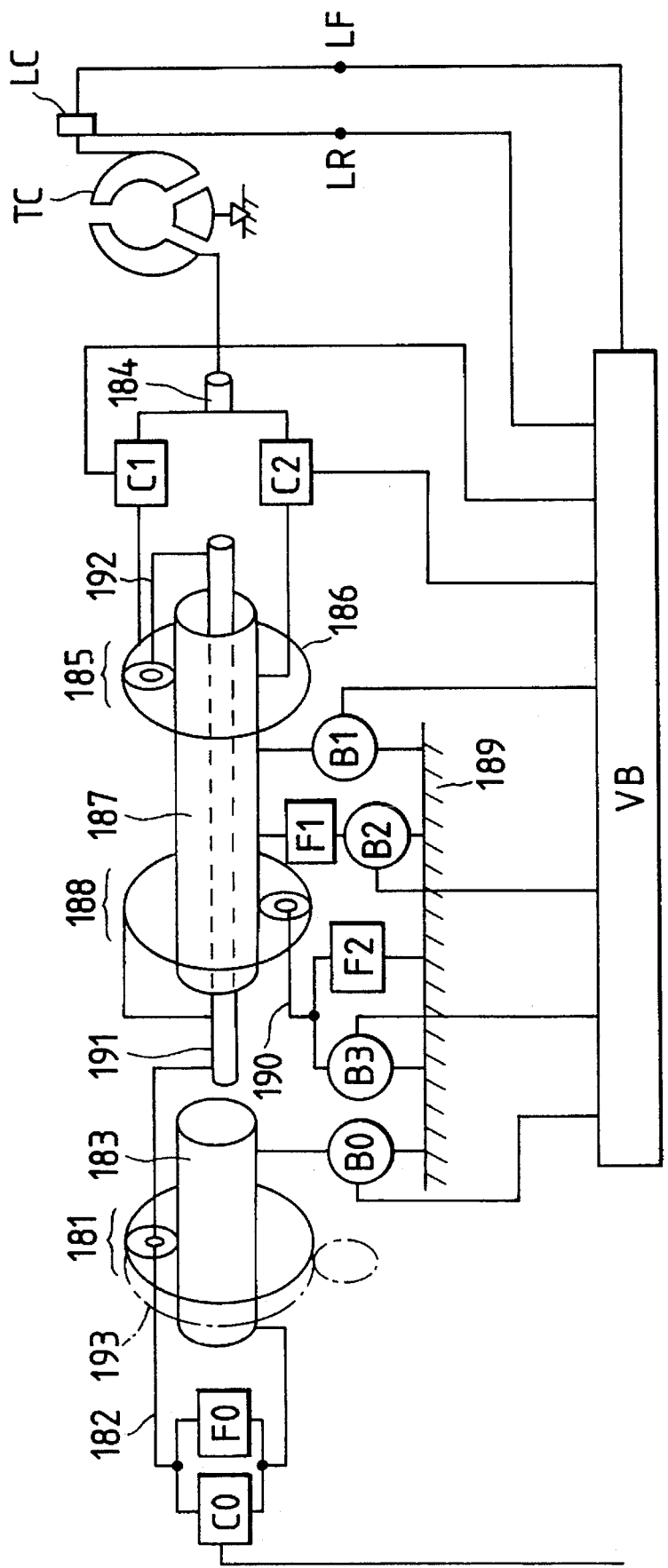
FIG. 3 is an illustration which shows a gear train of an automatic transmission.

FIG. 2 shows the hydraulic control system 300 which is disposed within a valve body VB of the automotive transmission system 1. The hydraulic control system 300 is connected to the power train 200 having the same typical structure as already mentioned in the introductory part of this specification with reference to FIG. 3, and description thereof in detail will be omitted here.

Internally, the hydraulic control system 300 includes solenoid valves 11, 12, 13, 14, 15, and 16, directional control valves 21, 22, 23, 24, 25, 26, 27, 28, and 29, a lock-up control valve 30, a pressure regulator valve 31, a manual valve 32, and a number of check valves and filters. The solenoid valves 11 to 16 include pressure ports 11P to 16P, control ports 11C to 16C, and return ports 11R to 16R, respectively. The pressure ports 11P to 16P each receive a line pressure supplied from the manual valve 32. The control ports 11C to 16C output the line pressure to the clutches and the brakes of the power train 200, respectively. The return ports 11R to 16R each communicate with a reservoir tank 40.

The manual valve 32 is operated by a shift lever (often called a selector lever), and includes a pressure port 32PP to which line pressure is supplied from an oil pump 80, a return port 32RR communicating with a reservoir tank 40, and a plurality of output ports 32P, 32R, 32N, 32D, 32II, and 32L for delivering the line pressure supplied through the pressure port 32PP according to a shift position of the shift lever. When a driver moves the shift lever to any one of P (Parking), R (Reverse), N (Neutral), D (Drive), II (first-to-third speed), and L (first-to-second speed) ranges, an end portion 322 of a spool 321 of the manual valve 32 is displaced to establish fluid communication between a corresponding one of the output ports 32P to 32L and the pressure port 32PP, while the other output ports communicate with the reservoir tank 40. For example, when the pressure port 32PP, as shown in FIG. 2, communicates with the output port 32P, all the output ports 32P, 32N, 32D, 32II, and 32L lead to the return port 32RR.

The output port 32P communicates with the overdrive clutch C0 of the power train 200 through a check valve 51. The output port 32R communicates with the overdrive clutch C0, the direct clutch C2, and the first and reverse brake B3 through check valves 52, 60, and 61, respectively. The output port 32N communicates with the overdrive clutch C0 through a check valve 53. The output port 32D communicates with the forward clutch C1 through check valves 55 and 57. The output port 32II communicates with the forward clutch C1 through a check valve 56. The output port 32L communicates with the overdrive clutch C0 and the forward clutch C1 through check valves 58 and 54.

The solenoid valve 11 has a pressure port 11P connected to the output port 32D of the manual valve 32 and a control port 11C connected to a port 28A of the directional control valve 28. The solenoid valve 12 has a pressure port 12P connected to both the output ports 32D and 32II of the manual valve 32 through check valves 62 and 63 and a control port 12C connected to a port 23B of the directional control valve 23 and a port 26A of the directional control valve 26.

The solenoid valve 13 has a pressure port 13P connected to the output ports 32D, 32II, and 32L of the manual valve 32 through check valves 64, 65, 66, and 67 and a control port 13C connected to a port 25D of the directional control valve 25. The solenoid valve 14 has a pressure port 14P connected to the output ports 32II and 32L of the manual valve 32 and a control port 14C connected to a port 28B of the directional control valve 28 and a port 24B of the directional control valve 24. The solenoid valve 15 has a pressure port 15P connected to a discharge port of the oil pump 80 through a filter 72 and a control port 15C connected to a port 31A of the pressure regulator valve 31. The solenoid valve 16 has a pressure port 16P communicating with a port 31G of the pressure regulator valve 31, a port 30B of the lock-up control valve 30, and the lock-up clutch LC through a rear hydraulic line LR. Its control port 16C communicates with a port 30C of the lock-up control valve 30.

The directional control valve 21 has ports 21A, 21B, 21C, and 21D. The port 21A communicates with ports 26C and 23C of the directional control valves 26 and 23. The port 21B leads to the reservoir tank 40. The port 21C connects with ports 22C and 24D of the directional control valves 22 and 24. The port 21D communicates with a port 30A of the lock-up control valve 30 and the second brake B2. The directional control valve 21 is responsive to the line pressure applied to the port 21C to establish fluid communication between the port 21D and the port 21B while fluid communication between the ports 21D and 21A is achieved when no line pressure is developed at the port 21C. The directional control valve 22 has a port 22A connected to the port 32R of the manual valve 32, a port 22B connected to the port 23D of the directional control valve 23, a port 22D connected to the first and reverse brake B3, and a port 22E connected to the direct clutch C2. The directional control valve 22, when no line pressure is applied to the port 22A, establishes fluid communications between the port 22E and the port 22B and between the port 22D and the port 22C, while it blocks these fluid communication when the line pressure is applied to the port 22A. The directional control valve 23 has a port 23A connected to the reservoir tank 40, and establishes fluid communication between a port 23D and the port 23A when the line pressure is applied to a port 23B, The directional control valve 24 has a port 24A connected to the reservoir tank 40 and a port 24C connected to the port 32L of the manual valve 32, and establishes fluid communication between the port 24D and the port 24A when no line pressure is applied to the port 24C, while it achieves fluid communication between the port 24D and the port 24B in response to the line pressure applied to the port 24C. The directional control valve 25 has a port 25A connected to the overdrive clutch C0 and a port 27D of the directional control valve 27, a port 25B connected to the reservoir tank 40, a port 25C connected to the port 32II of the manual valve 32, and a port 25E connected to both the port 23C of the directional control valve 23 and a port 29D of the directional control valve 29. The directional control valve 25 further has a port 25F which is connected to the overdrive brake B0 and is also connected to the port 23C of the directional control valve 23 through the check valve 59. The directional control valve 25, when the line pressure is applied to the port 25A, establishes fluid communications between the port 25F and the port 25B and between the port 25D and the port 25E, while when there is no line pressure, the port 25F communicates with the port 25C with fluid communication between the port 25D and the port 25E being blocked.

The directional control vale 26 has a port 26B connected to the reservoir tank 40, a port 26D connected to the port 32II of the manual valve 32, a port 26E connected to the port 32 of the manual valve 32, and a port 26F connected to the second coast brake B1. The directional control valve 26 normally establishes fluid communication between the port 26F and the port 26B. When the line pressure is applied to the port 26D or the port 26E, fluid communication between the port 26F and the port 26C is established, while when the line pressure is applied to both the port 26D and the port 26A, fluid communication between the port 26F and the port 26B is established. The directional control valve 27 has a port 27A connected to a port 28D of the directional control valve 28, a port 27B connected to the port 32D of the manual valve 32, and a port 27C connected to the port 32II of the manual valve 32. The directional control valve 27 normally blocks fluid communication between the port 27D and the port 27A, while when the line pressure is applied to the port 27B or the port 27C, fluid communication between the port 27D and the port 27A is established.

The directional control valve 28 has a port 28C connected to the port 32II of the manual valve 32, and establishes fluid communication between a port 28D and a port 28B when no line pressure is applied to the port 28C, while when the line pressure is applied to the port 28C, fluid communication between the port 28D and the port 28B is established. The directional control valve 29 has a port 29A connected to the port 32N of the manual valve 32, ports 29B and 29C connected to the reservoir tank 40, and a port 29E connected to the forward clutch C1. The directional control valve 29, when no line pressure is applied to the port 29A, blocks fluid communications between the port 29E and the port 29B and between the port 29D and the port 29C, while these fluid communications are established when the line pressure appears at the port 29A.

The lock-up control valve 30 has a port 30D connected to the front hydraulic line LF of the lock-up clutch LC, and establishes fluid communication between the port 30D and a port 30B when no line pressure appears at the port 30A, while when the line pressure appears, fluid communication between the port 30D and a port 30C is established.

The pressure regulator valve 31 has ports 31B and 31C connected to the reservoir tank 40, a port 31D connected to both the discharge port of the oil pump 80 and the pressure port 32PP of the manual valve 32 through the filter 71, a port 31E connected to the discharge port of the oil pump 80, and a port 31F connected to the discharge port of the oil pump 80 through a throttle or orifice 90. The pressure regulator valve 31 is designed to control the degree of hydraulic pressure at the ports 31D, 31E, and 31G according to a pressure level applied to the ports 31A and 31F.

FIG. 4 shows a Table 1 representing operative relations between positions of the shift lever among the P, R, N, D, II, and L ranges, and operative conditions of the frictional elements (i.e., clutches and brakes C0, C1, C2, B0, B1, and B3) of the power train 200. As seen from the Table 1, when the driver shifts the shift lever to a desired range, a preselected gear ratio is established by controlling engagement and disengagement of the clutches and the brakes C0, C1, C2, B0, B1, and B3 under activities of the solenoid valves 11 to 16.

An operation of the hydraulic control system 300 for controlling the clutches and the brakes of the power train 200 will be described below.

Figure 5:
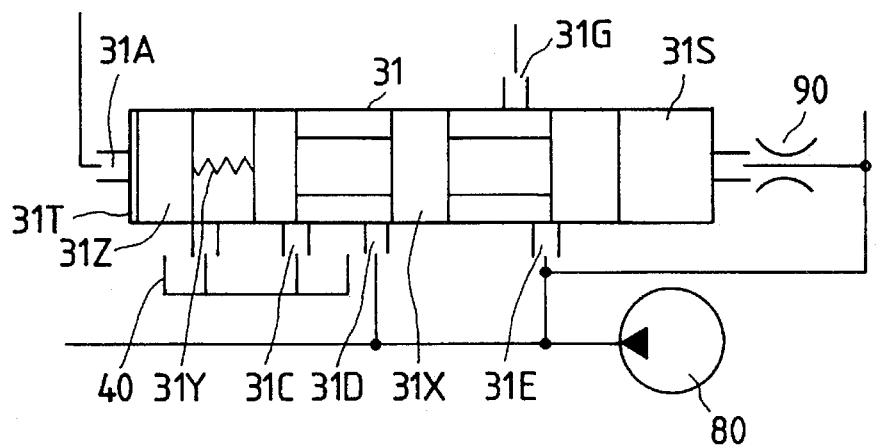
FIG. 5 is a cross-sectional view which shows a pressure regulator valve disposed in a hydraulic control system.

Initially, the oil pump 80 disposed within a housing of the automatic transmission is activated to provide a line pressure to the hydraulic control system 300 mounted in the valve body VB. The line pressure is then regulated by the pressure regulator valve 31 in the following manner. As the hydraulic pressure discharged from the oil pump 80 is elevated, the pressure in a pressure chamber 31S defined in the right end of the pressure regulator valve 31 is increased to move a spool 31X in the left direction, as viewed in the drawing, until the pressure in the pressure chamber 31S balances with a spring force of a spring 31Y. When the pressure in the pressure chamber 31S is further elevated to have the spool 31X reach a position shown in FIG. 5, it will cause the hydraulic pressure inputted to the port 31D to be directed to the reservoir tank 40 through the port 31C. This results in decreased line pressure, thereby causing the spool 31X to be displaced right to block fluid communication between the port 31D and the port 31C. This process is repeated to regulate the line pressure to a preselected set pressure.

The line pressure is also modified by the solenoid valve 15. When the solenoid valve 15 is energized to establish fluid communication between the pressure port 15P and the control port 15C for elevating a pressure level in a pressure chamber 31T defined in the left end of the pressure regulator valve 31, it will cause a land 31Z to move in a right direction, thereby compressing the spring 31Y to displace the spool 31X. Thus, the hydraulic pressure in the pressure chamber 3 is serving to establish the fluid communication between the ports 31D and 31C to direct the line pressure to the reservoir tank 40, is elevated to a level higher than that described above. As a result, the line pressure is further increased.

Conversely, when the solenoid valve 15 is turned off to connect the control port 15C to the return port 15R, the pressure in the pressure chamber 31T is decreased, thereby allowing the fluid communication between the port 31D and the port 31C to be established easily even when the pressure in the pressure chamber 31S is low, so that the line pressure is set lower. The higher line pressure is provided when it is required to supply the line pressure to the clutches quickly, while the lower line pressure is provided when it is required to reduce mechanical shocks upon engagement of the clutches.

The line pressure, supplied from the oil pump 80, regulated in pressure level by the pressure regulator valve 31 and the solenoid valve 15, as shown in FIG. 1, enters the pressure port 32PP of the manual valve 32 through the filter 71, and then is directed to any one of the output ports 32P, 32R, 32N, 32D, 32II, and 32L according to a valve position of the manual valve 32. For example, when the shift lever lies in the P rage, the pressure port 32PP communicates with the output port 32P, when it lies in the R range, the pressure port 32PP communicates with the output port 32R, when in the N range, the pressure port 32PP communicates with the output port 32N, when in the D range, the pressure port 32PP communicates with the output port 32D, when in the II range, the pressure port 32PP communicates with the output port 32II, and when in the L range, the pressure port 32PP communicates with the output port 32L.

P range

Figure 6:
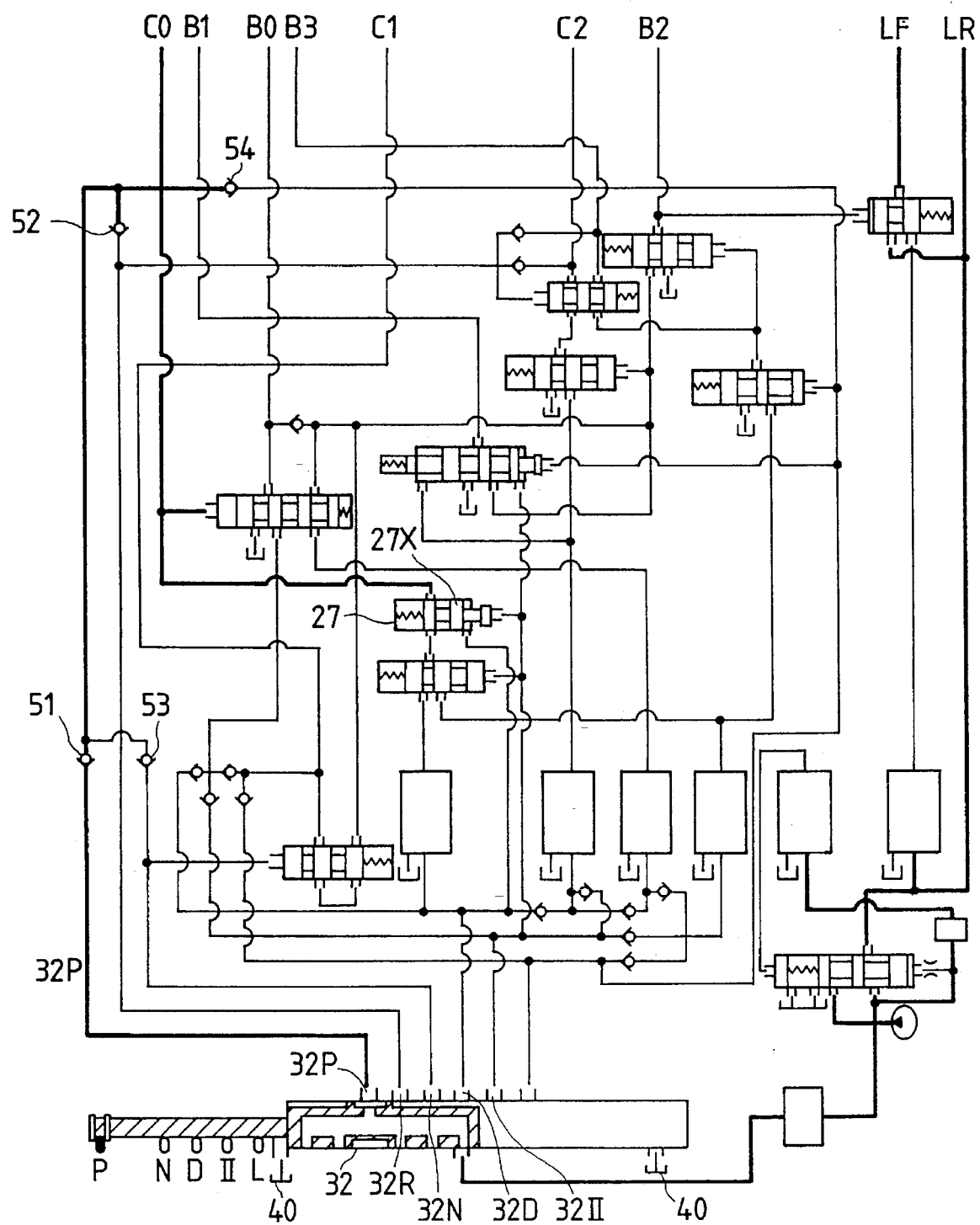
FIG. 6 is a hydraulic circuit diagram which shows the flow of hydraulic pressure in a parking mode of transmission operation.

Referring to FIG. 6, thick lines show the flow of hydraulic pressure in the P range.

When a driver shifts the shift lever to within the P range, the hydraulic pressure is supplied from the output port 32P of the manual valve 32 to the overdrive clutch C0 through the check valve 51 to achieve a parking mode of transmission operation. The activities of the check valves 52, 53, and 54 and the spool 27X of the directional control valve 27 inhibit the hydraulic pressure from being directed to other elements and the reservoir tank 40. In the P range, the output ports 32R, 32N, 32D, 32II, and 32L other than the output port 32P all communicate with the reservoir tank 40, so that the hydraulic pressure acts on the clutch C0 only.

R range

Figure 7:
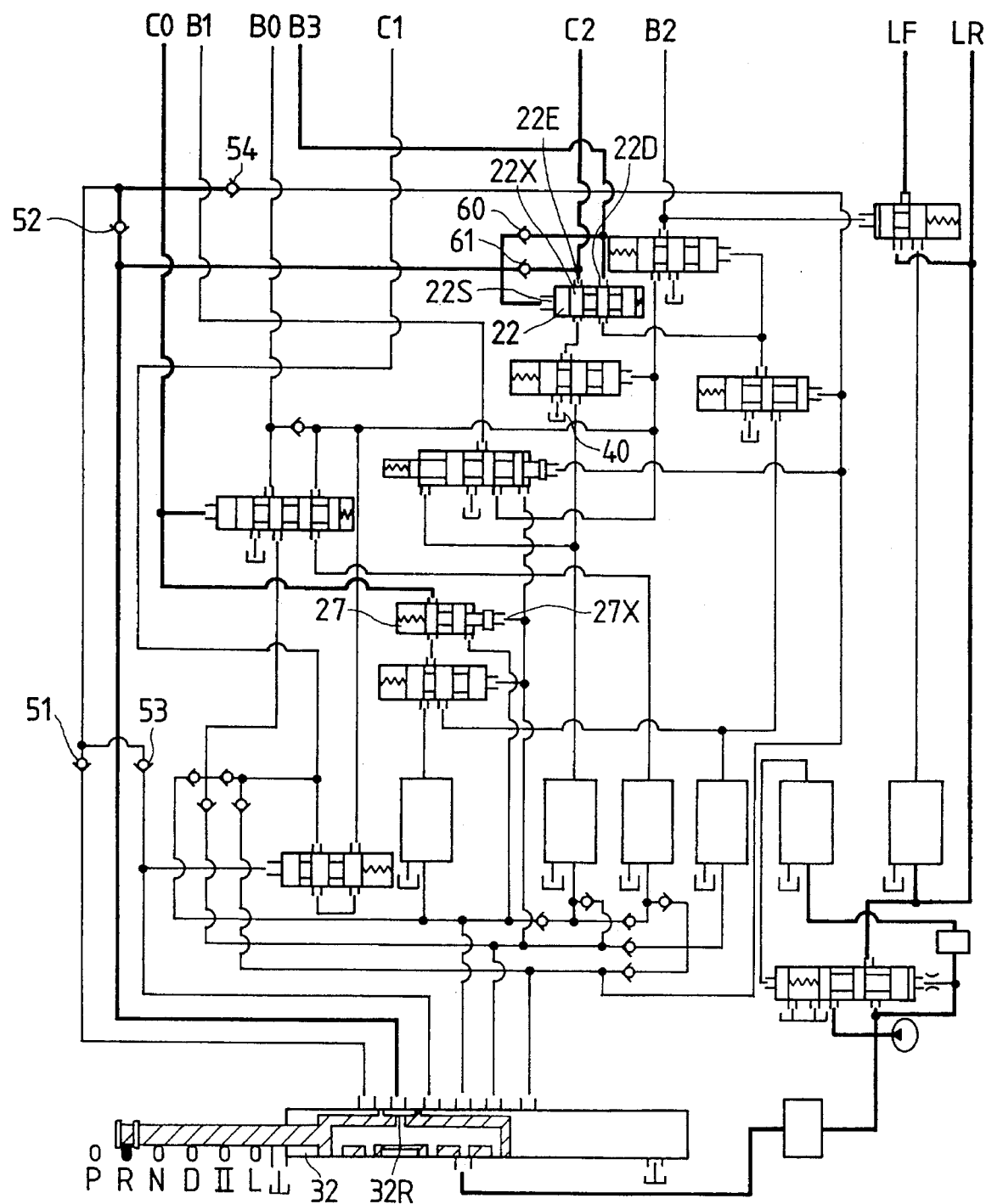
FIG. 7 is a hydraulic circuit diagram which shows the flow of hydraulic pressure in a reverse mode of transmission operation.

Referring to FIG. 7, there is shown the flow of hydraulic pressure in the R range.

When the driver shifts the shift lever to the R range, the hydraulic pressure is supplied from the output port 32R of the manual valve 32 to act on the overdrive clutch C0 through the check valve 52, and also acts on both the first and reverse brake B3 through the check valve 60 and the direct clutch C2 through the check valve 61. Additionally, the hydraulic pressure reaches the pressure chamber 22S of the directional control valve 22 so that it urges the spool 22X in the right direction to block the ports 22D and 22E, thereby restricting the hydraulic pressure acting on the direct clutch C2 and the first and reverse brake B3 from being returned back to the reservoir tank 40. The activities of the check valves 54, 51, and 53 and spool 27X of the directional control valve 27 prevent the hydraulic pressure from being directed to other elements and the reservoir tank 40. Therefore, the hydraulic pressure provided from the output port 32R of the manual valve 32 act on only the clutches C0 and C2 and the brake B3 to establish a reverse mode of transmission operation.

N range

Figure 8:
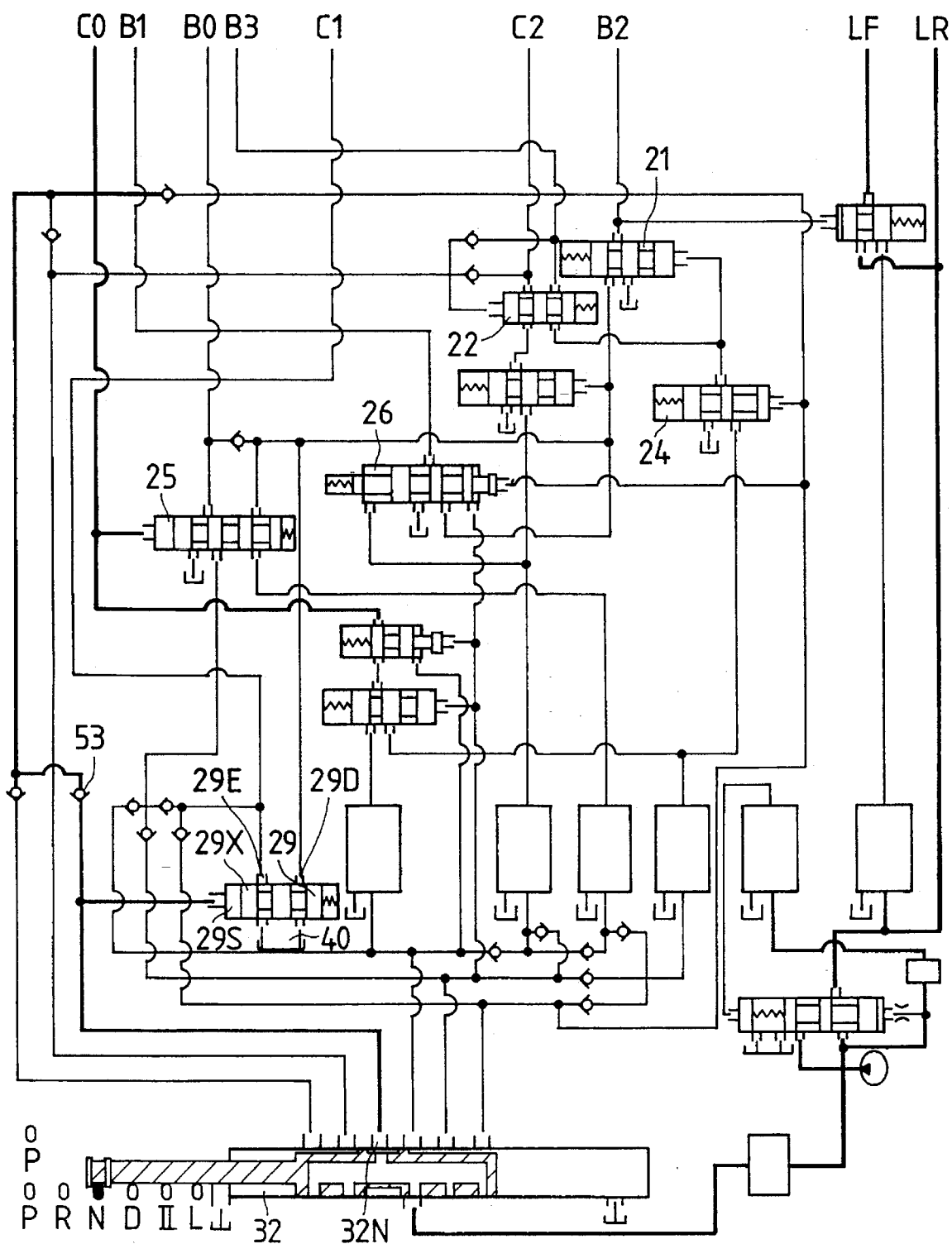
FIG. 8 is a hydraulic circuit diagram which shows the flow of hydraulic pressure in a neutral mode of transmission operation.

Referring to FIG. 8, there is shown the flow of hydraulic pressure in the N range.

When the driver shifts the shift lever to the N range, the hydraulic pressure is outputted from the output port 32N of the manual valve 32 and then acts on the overdrive clutch C0 through the check valve 53. It also reaches the pressure chamber 29S of the directional control valve 29 to urge the spool 29X in the right direction to have the ports 29D and 29E communicate with the reservoir tank 40, thereby causing the hydraulic pressure in the forward clutch C1 to be drawn into the reservoir tank 40. Additionally, the hydraulic pressure in the overdrive brake B0 is released to the reservoir tank 40 through the directional control valve 25, and the hydraulic pressure in the first and reverse brake B3 is also released to the reservoir tank 40 through the directional control valves 22 and 24. Thus, only the overdrive clutch C0 is actuated to establish a neutral mode of transmission operation.

1st mode (D-1) in D range

Figure 9:
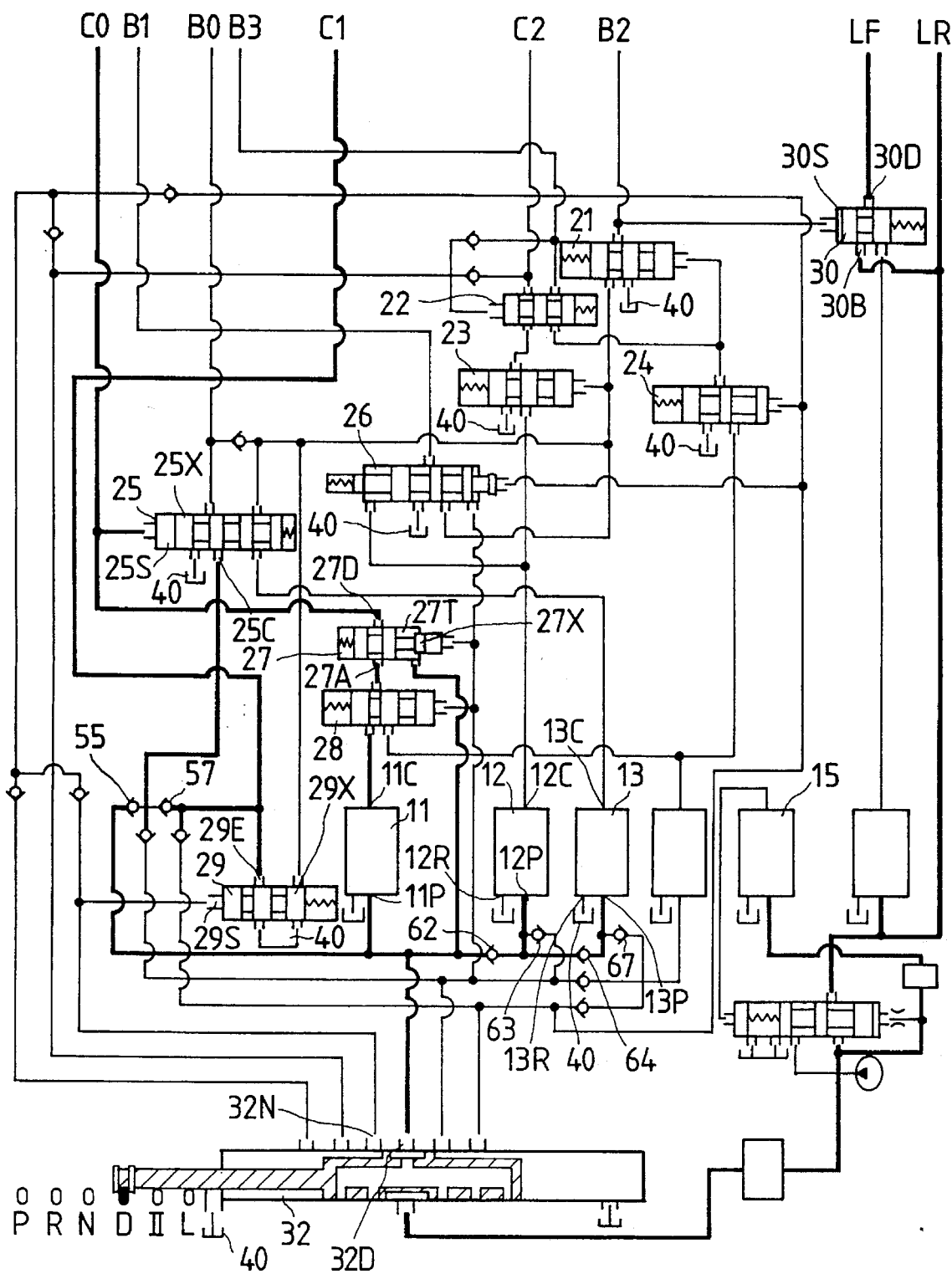
FIG. 9 is a hydraulic circuit diagram which shows the flow of hydraulic pressure in a 1st mode of a drive range.

Referring to FIG. 9, there is shown the flow of hydraulic pressure in a 1st (D-1) mode for establishing 1st speed in the D range. When the driver shifts the shift lever to the D range and it is required to establish the 1st speed according to the given operation schedule, the hydraulic pressure is initially outputted from the output port 32D of the manual valve 32, as shown by a thick line, and acts on the forward clutch C1 through the check valves 55 and 57. Upon movement of the shift lever to the D rage, the hydraulic pressure in the pressure chamber 29S of the directional control valve 29 is released to the reservoir tank 40 through the output port 32N of the manual valve 32 to displace the spool 29X to the leftmost position, thereby blocking the port 29E for restricting hydraulic fluid in the forward clutch C1 from flowing into the reservoir tank 40. The engagement of the forward clutch C1 is, as described above, fine adjusted by turning off the solenoid valve 15 for a given period of time to reduce the line pressure to a preselected lower level temporarily for absorbing a shift shock which would make vehicle occupants feel uncomfortable.

The line pressure from the output port 32D is also supplied to the pressure port 11P of the solenoid valve 11, the pressure port 12P of the solenoid valve 12 through the check valve 62, and the pressure port 13P of the solenoid valve 13 through the check valve 64. The check valves 63 and 67 serve to block the flow of the line pressure to the output ports 32II and 32L of the manual valve 32. In the D-1 mode, the normally-closed solenoid valve 11 is energized to establish fluid communication between the pressure port 11P and the control port 11C. In addition, the normally-open solenoid valves 12 and 13 are also energized to establish fluid communications between the control port 12C and the return port 12R and between the control port 13C and the return port 13R. Therefore, the line pressure from the output port 32D of the manual valve 32 passes through the solenoid valve 11 and the directional control valve 28 and then reaches the port 27A of the directional control valve 27. The line pressure from the output port 32D of the manual valve 32 is also introduced into the pressure chamber 27T of the directional control valve 27 to displace the spool 27X for fluid communication between the ports 27A and 27D, so that the hydraulic pressure reaching the port 27A is directed to the overdrive clutch C0.

The solenoid valve 11 is duty-controlled by the solenoid valve controller 400, as shown in FIG. 1, so as to repeat opening and closing operations with a preselected timing for smooth engagement of the overdrive clutch C0. The line pressure from the output port 32D of the manual valve 32, as can be seen in the drawing, also reaches the port 25C of the directional control valve 25 through the check valve 55, however, it is blocked since the line pressure from the output port 32D acts on the pressure chamber 25S of the directional control valve 25 to urge the spool 25X in the right direction, closing the port 25C. Further, the second coast brake B0 communicates with the reservoir tank 40 through the directional control valve 25. The direct clutch C2 communicates with the reservoir tank 40 through the directional control valves 22 and 23. The second brake B2 communicates with the reservoir tank 40 through the directional control valves 21 and 25 and the solenoid valve 13. Accordingly, the line pressure provided through the manual valve 32 acts on only the forward clutch C1 and the overdrive clutch C0 to establish the D-1 mode.

2nd mode (D-2) in D range

Figure 10:
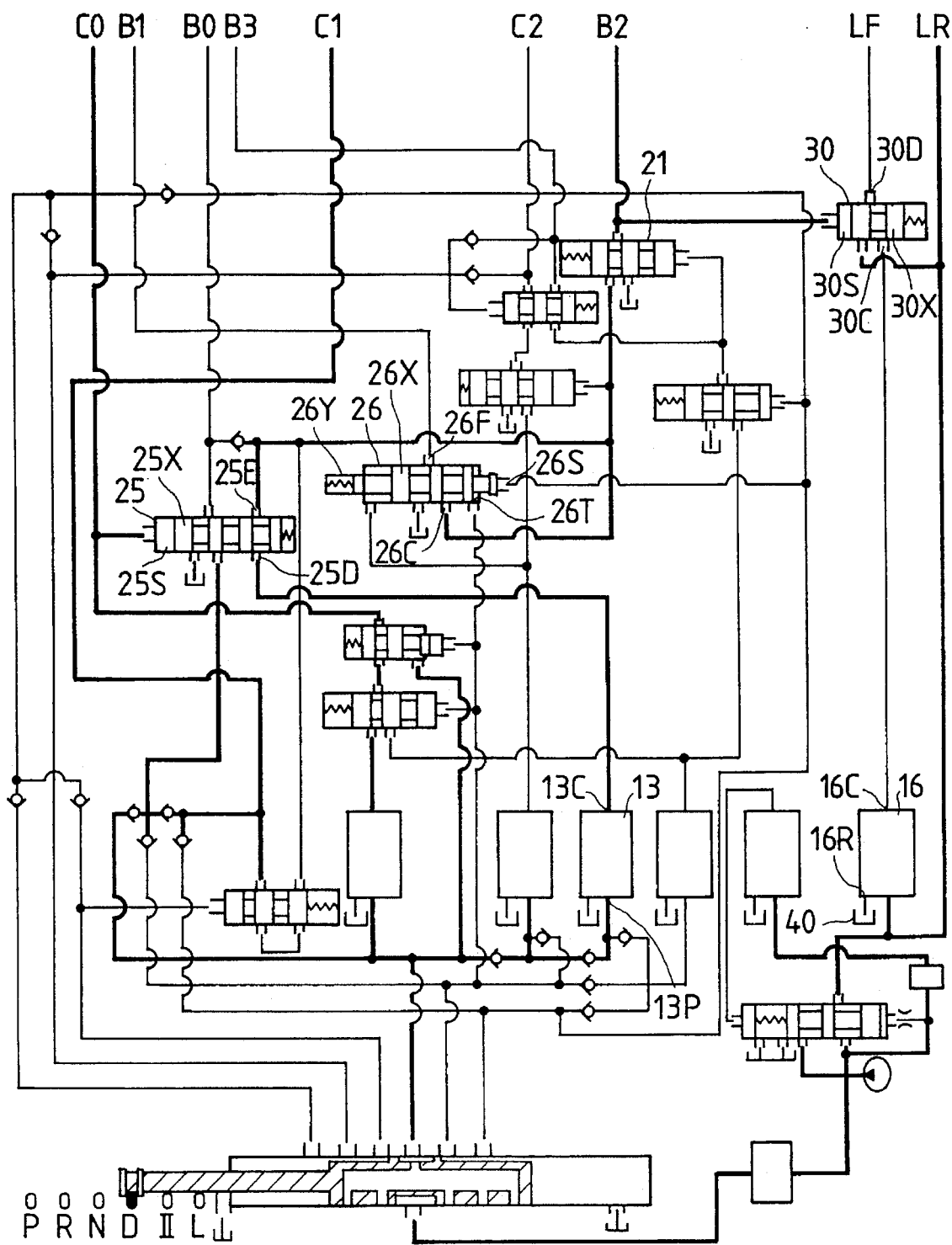
FIG. 10 is a hydraulic circuit diagram which shows the flow of hydraulic pressure in a 2nd mode of a drive range.

Referring to FIG. 10, there is shown the flow of hydraulic pressure in a 2nd (D-2) mode for establishing 2nd speed in the D range. The D-2 mode is different from the D-1 mode only in that the normally-open solenoid valve 13 is turned off to establish fluid communication between the pressure port 13P and the control port 13C, and other operations, or hydraulic flow is identical.

When the solenoid valve 13 is deenergized, the line pressure is supplied from the control port 13C to the port 25D of the directional control valve 25. To the pressure chamber 25S of the directional control valve 25, the line pressure supplied from the solenoid valve 11 is introduced to urge the spool 25X in the right direction, fluid communication between the ports 25D and 25E being thereby established to direct the hydraulic pressure entering the port 25D to the second brake B2 through the directional control valve 21. The hydraulic pressure also reaches the port 26C of the directional control valve 26, however, it is blocked here since no pressure is applied to the pressure chambers 26S and 26T so that the spool 26X is biased right by the spring 26Y to block fluid communication between the ports 26C and 26F. The solenoid valve 13 is, likewise to the solenoid valve 11, duty-controlled so as to elevate the hydraulic pressure acting on the second brake B2 gradually for achieving smooth engagement thereof. In the above manner, the clutches C1 and C0 and the brake B2 are activated to establish the D-2 mode.

3rd mode (D-3) in D range

Figure 11:
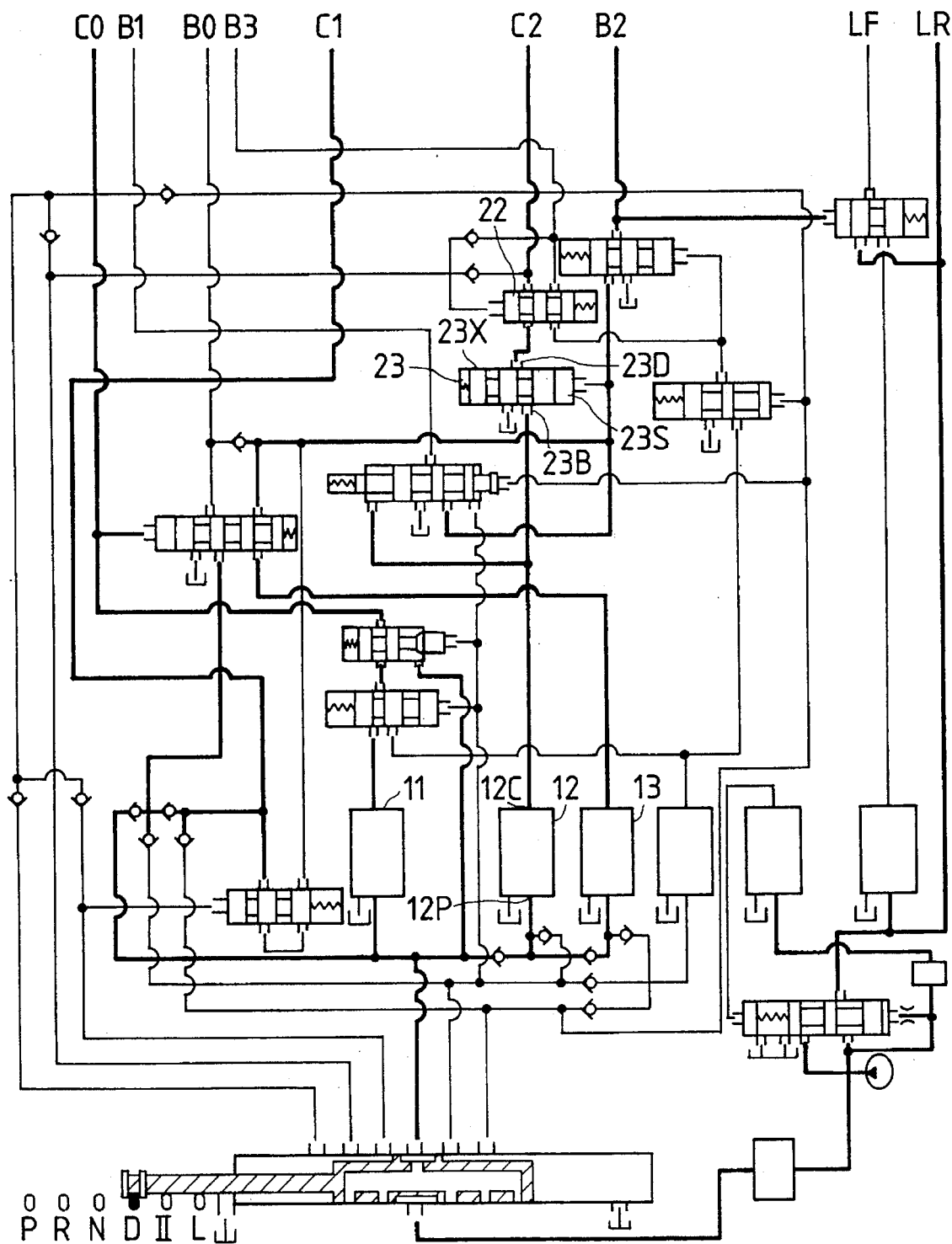
FIG. 11 is a hydraulic circuit diagram which shows the flow of hydraulic pressure in a 3rd mode of a drive range.

Referring to FIG. 11, there is shown the flow of hydraulic pressure in a 3rd (D-3) mode for establishing 3rd speed in the D range. The D-3 mode is different from the D-2 mode only in that the normally-open solenoid valve 12 is turned off to establish fluid communication between the pressure port 12P and the control port 12C, and other operations, or hydraulic flow is identical.

When the solenoid valve 12 is turned off, the control port 12C provides the line pressure to the port 23B of the directional control valve 23. To the pressure chamber 23S of the directional control valve 23, the hydraulic pressure is supplied from the solenoid valve 13 to bias the spool 23X in the right direction, thereby establishing fluid communication between the ports 23B and 23D to direct the hydraulic pressure entering the port 23B to the direct clutch C2 through the directional control valve 22. The solenoid valve 12 is, likewise to the solenoid valves 11 and 13, duty-controlled so as to gradually elevate the hydraulic pressure acting on the direct clutch C2 at a preselected rate for achieving smooth engagement thereof. In the above manner, the clutches C1, C0, and C2 and the brake B2 are activated to establish the D-3 mode.

Overdrive (O/D) mode in D range

Figure 12:
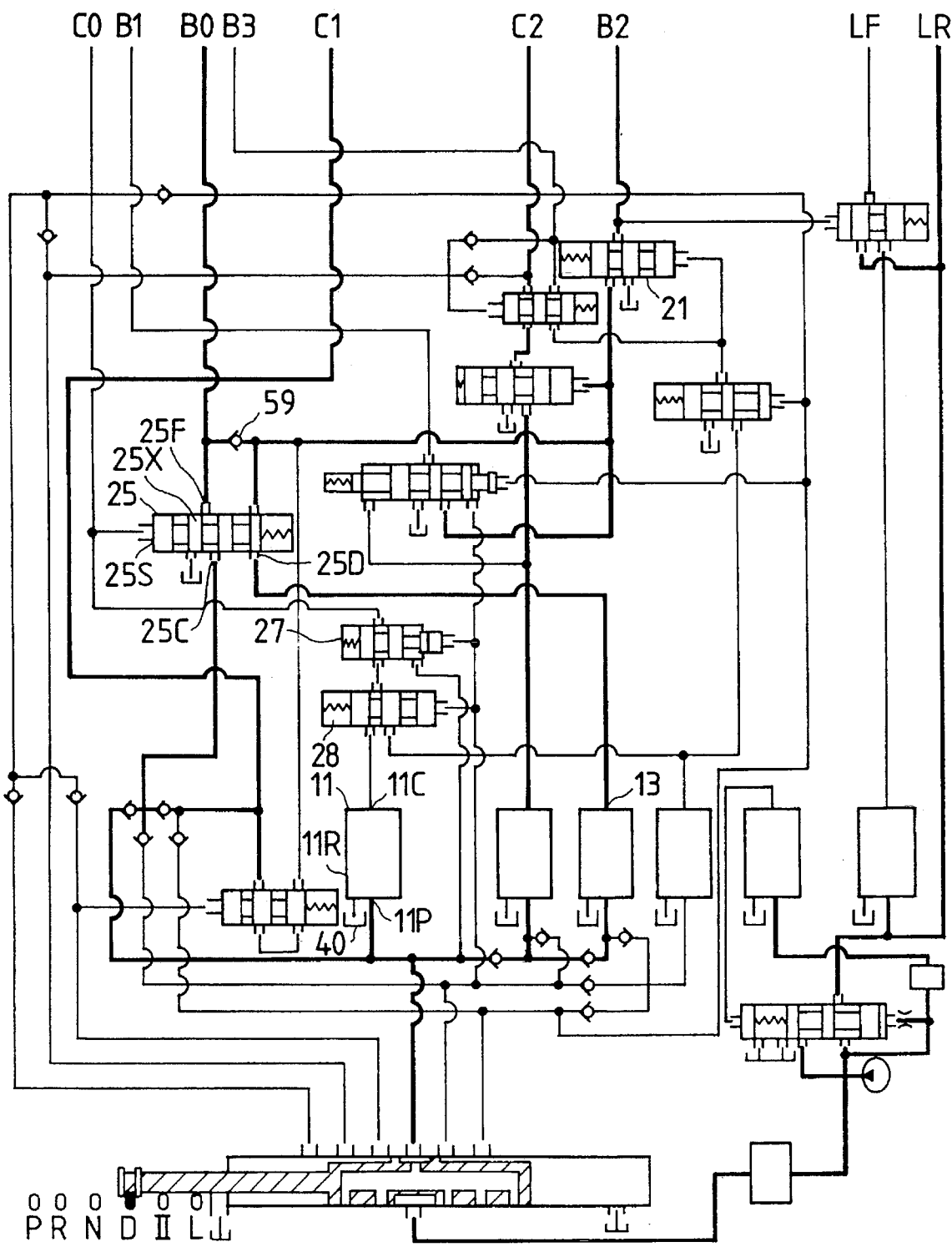
FIG. 12 is a hydraulic circuit diagram which shows the flow of hydraulic pressure in a overdrive mode of a drive range.

Referring to FIG. 12, there is shown the flow of hydraulic pressure in an overdrive (O/D) mode for establishing overdrive speed in the D range. The O/D mode is different from the D-3 mode only in that the normally-closed solenoid valve 11 is turned off to establish fluid communication between the control port 11C and the return port 11R, and other operations, or hydraulic flow is identical.

When the solenoid valve 11 is turned off, it will cause the hydraulic pressure acting on the overdrive clutch C0 to be released to the reservoir tank 40 through the directional control valves 27 and 28 and the control port 11C and the return port 11R of the solenoid valve 11. As a result, the hydraulic pressure in the pressure chamber 25S of the directional control valve 25 is also released to the reservoir tank 40 so that the spool 25X moves in the left direction, causing the port 25C to communicate with the port 25F with the port 25 being blocked. The hydraulic pressure reaching the port 25C of the directional control valve 25 is thus applied to the overdrive brake B0.

The supply of the hydraulic pressure to the second brake B2 through the directional control valve 25 is cut by displacement of the spool 25X, however, the line pressure supplied to the port 25C is delivered both to the overdrive brake B0 and to the second brake B2 through the check valve 59 and the directional control valve 21. Accordingly, the clutches C1 and C2 and brakes B0 and B2 are activated to establish the O/D mode.

1st mode (II-1) in II range

Figure 13:
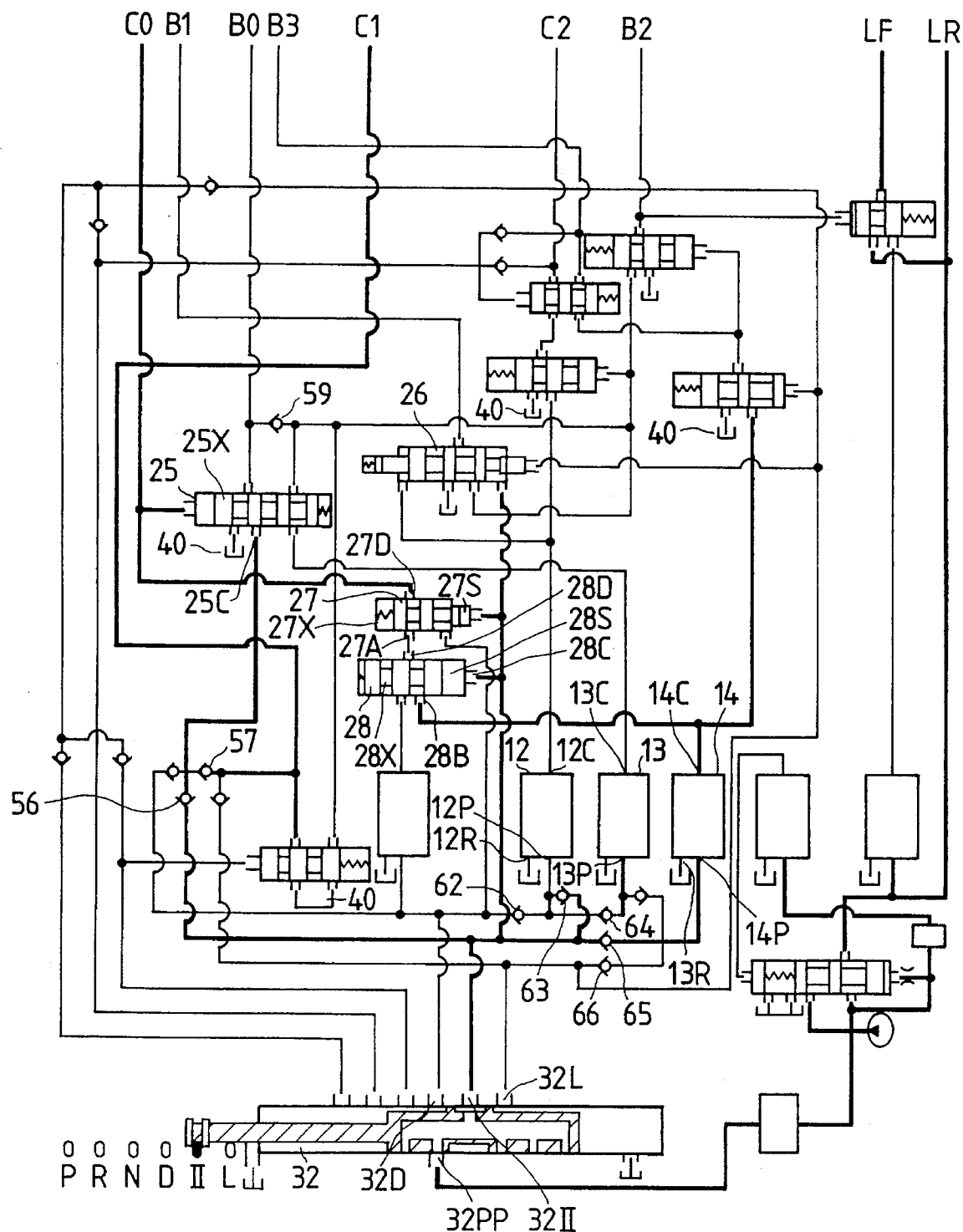
FIG. 13 is a hydraulic circuit diagram which shows the flow of hydraulic pressure in a 1st mode of a II range.

Referring to FIG. 13, there is shown the flow of hydraulic pressure in a 1st (II-1) mode for establishing 1st speed in the II range.

When the shift lever is shifted to the II range, the manual valve 32 establishes fluid communication between the pressure port 32PP and the output port 32II to provide the line pressure to the forward clutch C1 through the check valves 56 and 57. The line pressure also acts on the pressure port 12P of the solenoid valve 12, the pressure port 13P of the solenoid valve 13, and the pressure port 14P of the solenoid valve 14 through the check valves 63, 64, and 65 respectively. The check valves 62 and 66 serve to block the flow of the hydraulic pressure back to the output ports 32D and 32L of the manual valve 32.

When it is required to establish the 1st speed in the II range, the normally-open solenoid valves 12 and 13 are turned on to establish fluid communications between the control port 12C and the return port 12R and between the control port 13C and the return port 13R. On the other hand, the normally-open solenoid valve 14 is turned off to establish fluid communication between the pressure port 14P and the control port 14C so that the line pressure is supplied to the port 28B of the directional control valve 28. The line pressure from the output port 32II of the manual valve 32 also acts on both the pressure chambers 28S and 27S of the directional control valves 28 and 27 to displace the spools 28X and 27X to the left position for establishing fluid communications between the ports 28B and 28D and between the ports 27A and 27D, respectively. Thus, the line pressure reaching the port 28B of the directional control valve 28 is supplied to the overdrive clutch C0.

Additionally, the line pressure is also delivered to the port 25C of the directional control valve 25 through the check valve 56, however, it is blocked here since the hydraulic pressure outputted from the directional control valve 27 is exerted on the pressure chamber 25S of the directional control valve 25 so that the spool 25X is biased to block the port 25C. The hydraulic pressures activating the brakes B0, B2, and B3 and the clutch C2 are, similar to the D-1 mode, released to the reservoir tank 40. Further, the hydraulic pressure in the brake B1 is also released to the reservoir tank 40 through the directional control valves 26 and 25 and the solenoid valve 13. Accordingly, the forward clutch C1 and the overdrive clutch C0 are actuated to establish the II-1 mode in the II range.

2nd mode (II-2) in H range

Figure 14:
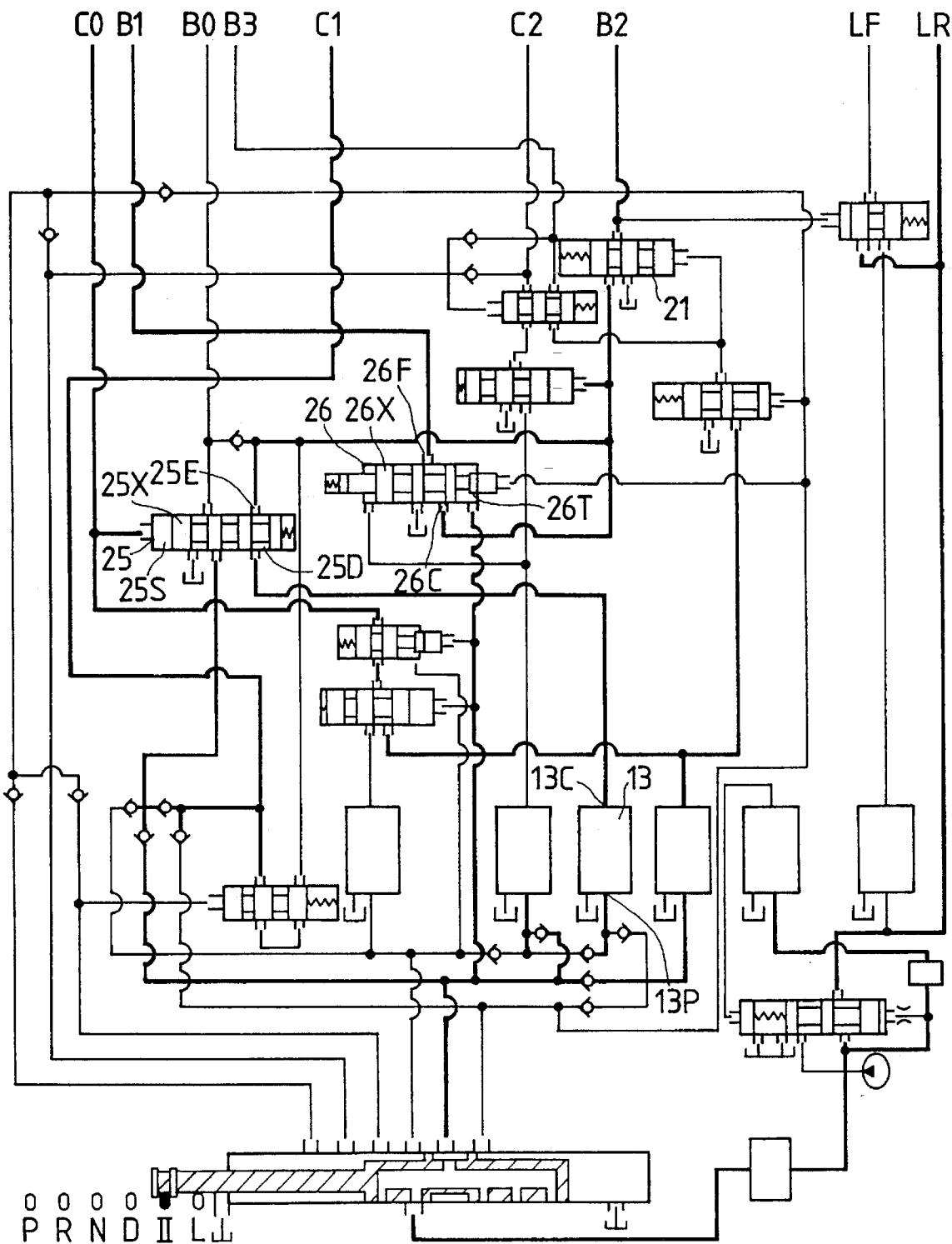
FIG. 14 is a hydraulic circuit diagram which shows the flow of hydraulic pressure in a 2nd mode of a II range.

Referring to FIG. 14, there is shown the flow of hydraulic pressure in a 2nd (II-2) mode for establishing 2nd speed in the II range.

The II-2 mode is different from the II-1 mode only in that the normally-open solenoid valve 13 is turned off to fluidly connect the pressure port 13P with the control port 13C, and other operations or hydraulic flow is identical.

When it is required to establish 2nd speed in the II range, the solenoid valve controller 400 turns off the solenoid valve 13 to provide the line pressure to the port 25D of the directional control valve 25. The directional control valve 25 is in a position to establish fluid communication between the ports 25D and 25E since the pressure in the pressure chamber 25S is raised to bias the spool 25X in the right direction. The line pressure reaching the port 25D is thus supplied to the second brake B2 through the directional control valve 21. The line pressure from the output port 32II of the manual valve 32 is also delivered to the pressure chamber 26T of the directional control valve 26 so that the spool 26X is urged in the left direction for establishing fluid communication between the ports 26C and 26F. The hydraulic pressure reaching the port 26C outputted from the directional control valve 25 is thus supplied to the second coast brake B1. In the above manner, the forward clutch C1, the overdrive clutch C0, the second coast brake B1, and the second brake B2 are actuated to establish the II-2 mode in the II range.

3rd mode (II-3) in II range

Figure 15:
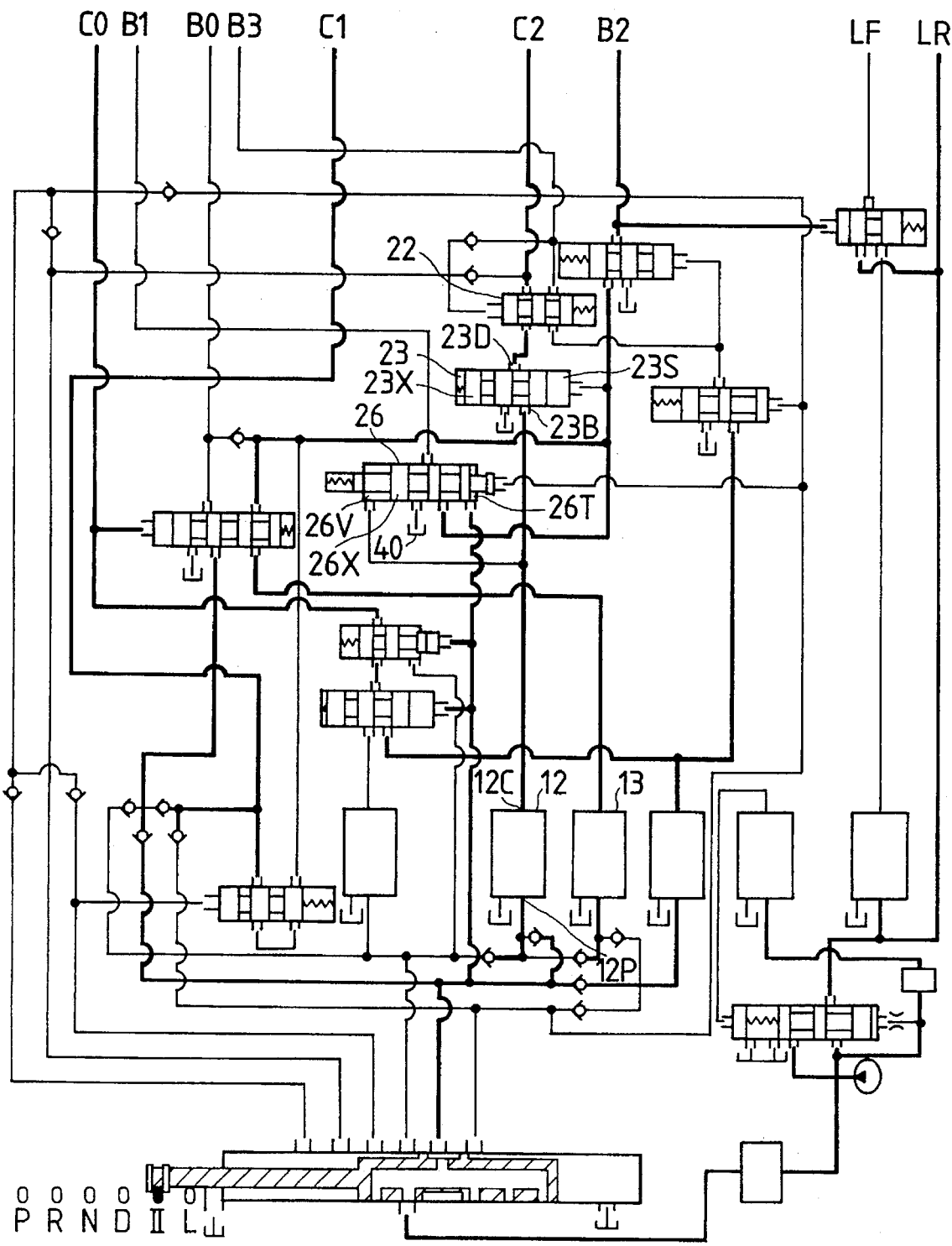
FIG. 15 is a hydraulic circuit diagram which shows the flow of hydraulic pressure in a 3rd mode of a II range.

Referring to FIG. 15, there is shown the flow of hydraulic pressure in a 3rd (II-3) mode for establishing 3rd speed in the II range.

The II-3 mode is different from the II-2 mode only in that the normally-open solenoid valve 12 is turned off to fluidly connect the pressure port 12P with the control port 12C, and other operations or hydraulic flow is identical.

When it is required to establish 3rd speed in the II range, the solenoid valve controller 400 turns off the solenoid valve 12 to provide the line pressure to the port 23B of the directional control valve 23. The directional control valve 23 is in a position to establish fluid communication between the ports 23B and 23D since the line pressure is supplied to the pressure chamber 23S from the solenoid valve 13 to bias the spool 23X in the left direction. The line pressure reaching the port 23B is thus supplied to the direct clutch C2 through the directional control valve 22. The hydraulic pressure from the control port 12C of the solenoid valve 12 also acts on the pressure chamber 26V of the directional control valve 26 so that the spool 26X is displaced right against a spring force. Therefore, the hydraulic pressure in the second coast brake B2 is released to the reservoir tank 40 through the directional control valve 26. In this manner, the forward clutch C1, the overdrive clutch C0, the direct clutch C2, and the second brake B2 are brought into engagement to establish the II-3 mode in the II range.

1st mode (L-1) in L range

Figure 16:
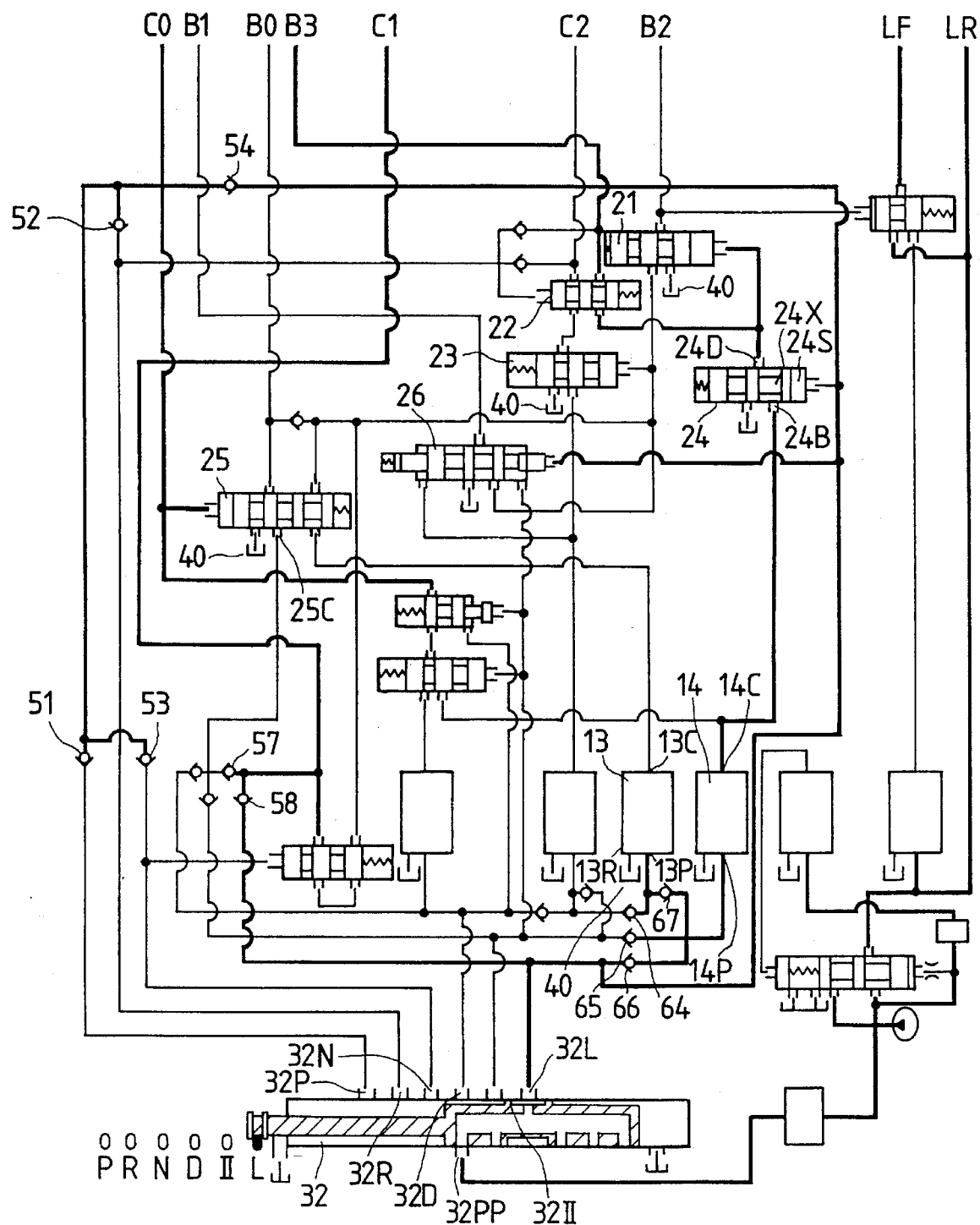
FIG. 16 is a hydraulic circuit diagram which shows the flow of hydraulic pressure in a 1st mode of an L range.

Referring to FIG. 16, there is shown the flow of hydraulic pressure in a 1st (L-I) mode for establishing 1st speed in the L range.

When the shift lever is moved to the L range and it is required to establish the 1st speed, the manual valve 32 assumes a valve position to establish fluid communication between the pressure port 32PP and the output port 32L to provide the line pressure to the forward clutch C1 through the check valve 58. The check valve 57 serves to block the hydraulic fluid flow to the output ports 32D and 32II of the manual valve 32 and the port 25C of the directional control valve 25. The line pressure from the output port 32L of the manual valve 32 also acts on the overdrive clutch C0 through the check valve 54. The check valves 51, 52, and 53 serve to block the hydraulic fluid flow to the ports 32P, 32R, and 32N of the manual valve 32. The line pressure from the output port 32L is further supplied to the pressure port 14P of the solenoid valve 14 through the check valve 66 and also reaches the pressure port 13P of the solenoid valve 13 through the check valve 67. The check valves 65 and 64 serve to block the hydraulic fluid flow to the output ports 32D and 32II of the manual valve 32.

When it is required to establish the L-1 mode in the L range, the solenoid valve controller 400 energizes the normally-open solenoid valves 13 to establish fluid communications between the control port 13P and the return port 13R, while it deenergizes the normally-open solenoid valve 14 to establish fluid communication between the pressure port 14P and the control port 14C. Thus, the line pressure provided from the manual valve 32 is supplied through the solenoid valve 14 to the port 24B of the directional control valve 24. The directional control valve 24 is responsive to the line pressure supplied from the output port 32L of the manual valve 32 to the pressure chamber 24S thereof so that the spool 24X is biased to the left, establishing fluid communication between the ports 24B and 24D. This causes the hydraulic pressure reaching the port 24B to be supplied through the directional control valves 24 and 22 to the first and reverse brake B3.

The hydraulic pressure acting on the first and reverse brake B3 is drained to the reservoir tank 40 through the directional control valve 25. The hydraulic pressure of the second coast brake B1 is drained to the reservoir tank 40 through the directional control valves 26 and 25 and the solenoid valve 13. The hydraulic pressure of the direct clutch C2 is also drained to the reservoir tank 40 through the directional control valves 22 and 23. Further, the hydraulic pressure of the second brake B2 is drained to the reservoir tank 40 through the directional control valve 21. In this manner, the forward clutch C1, the overdrive clutch C0, and the first and reverse brake B3 are actuated to achieve the L-1 mode in the L range.

2nd mode (L-2) in L range

Figure 17:
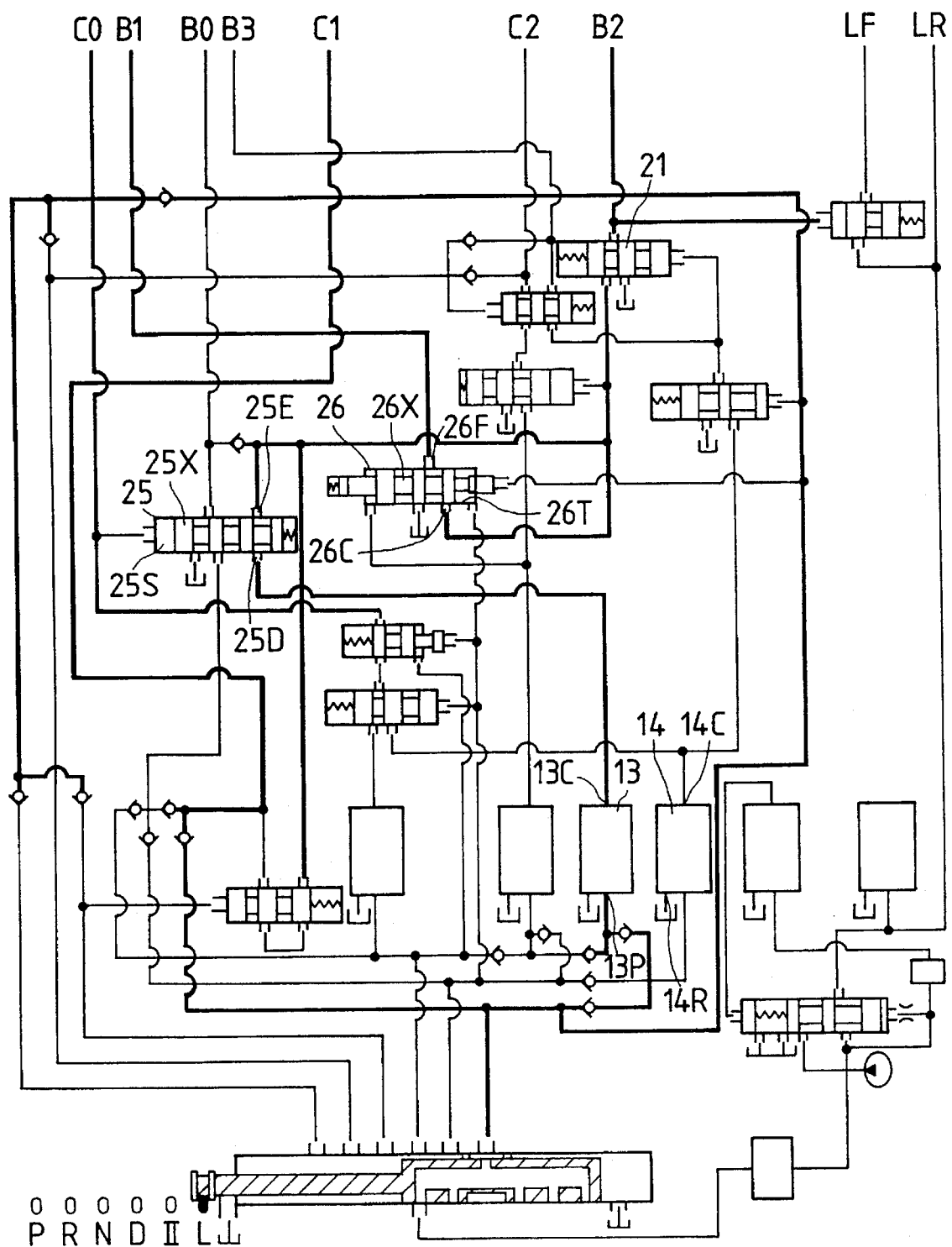
FIG. 17 is a hydraulic circuit diagram which shows the flow of hydraulic pressure in a 2nd mode of an L range.
Figure 18:
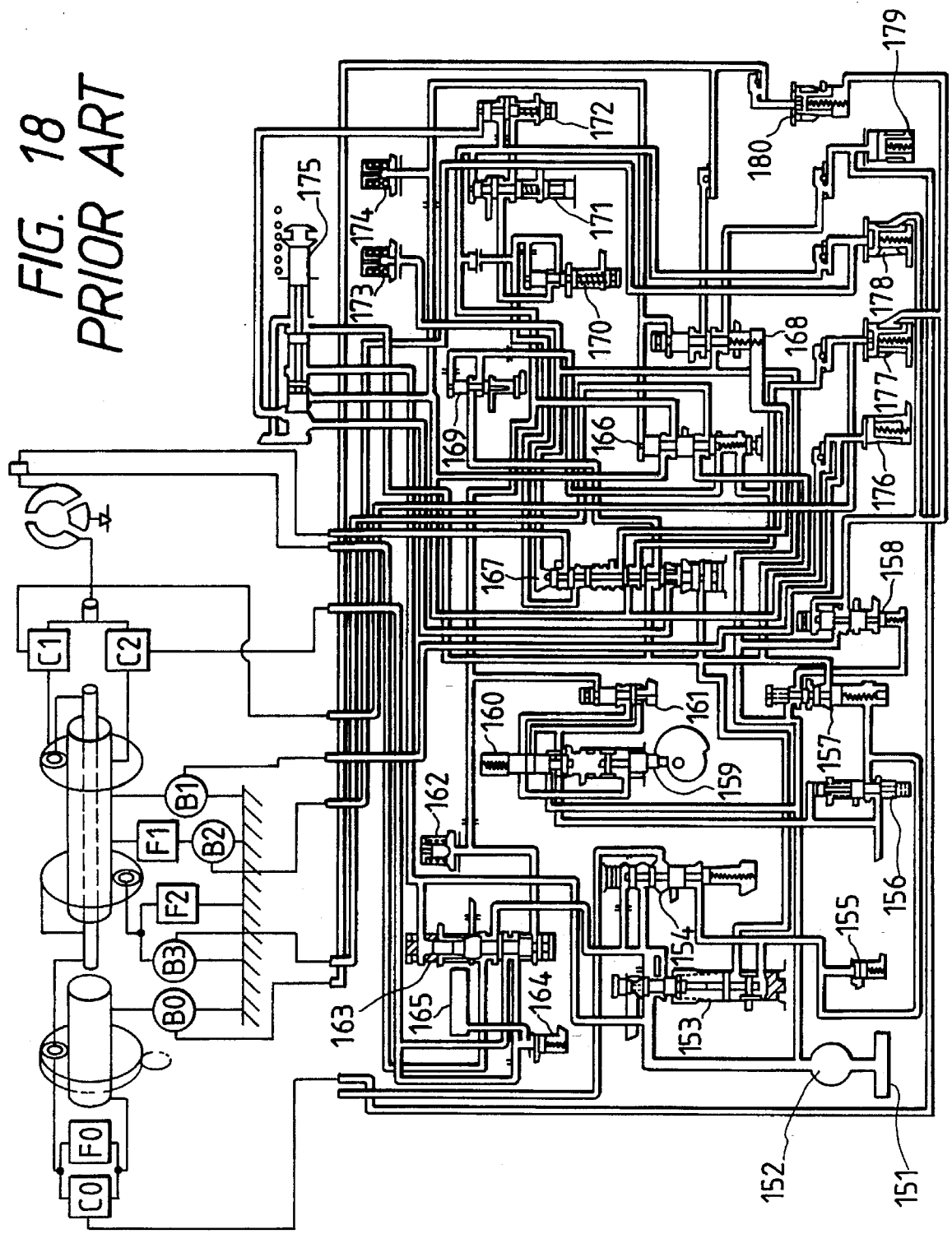
FIG. 18 is a hydraulic circuit diagram which shows a conventional hydraulic control system for an automatic transmission.

Referring to FIG. 17, there is shown the flow of hydraulic pressure in a 2nd (L-2) mode for establishing 2nd speed in L range.

The L-2 mode is different from the L-1 mode only in that the normally-open solenoid valve 13 is turned off to fluidly connect the pressure port 13P with the control port 13C, while the solenoid valve 14 is turned on to establish fluid communication between the control port 14C and the return port 14R. Other operations or hydraulic flow is identical.

When it is required to establish the 2nd speed in the L range, the solenoid valve controller 400 first turns off the solenoid valve 13 to provide the line pressure to the port 25D of the directional control valve 25. The directional control valve 25 is in a position to establish fluid communication between the ports 25D and 25E since the pressure in the pressure chamber 25S is raised to bias the spool 25X in the right direction. The line pressure reaching the port 25D is thus supplied to the second brake B2 through the directional control valve 21 and also supplied to the port 26C of the directional control valve 26. The directional control valve 26 assumes a valve position to urge the spool 26X in the left direction in response to the pressure supplied to the pressure chamber 26T from the manual valve 32 so that fluid communication between the ports 26C and 26F is established. Therefore, the hydraulic pressure reaching the port 26C is supplied to the second coast brake B1. With these valve operations, the forward clutch C1, the overdrive clutch C0, the second coast brake B1, and the second brake B2 are actuated to establish the L-2 mode in the L rage.

Lock-up mode

To the rear hydraulic line LR of the lock-up clutch LC, the hydraulic pressure provided by the oil pump 80 is always supplied through the pressure regulator valve 31. When the hydraulic pressure is supplied to the front hydraulic line LF, the lock-up clutch LC is released, while reduction in pressure in the front hydraulic line LF causes the lock-up clutch LC to engage.

As shown in FIG. 9, when the pressure in the pressure chamber 30S of the lock-up control valve 30 is drained to the reservoir tank 40 through the directional control valve 29, it will cause the port 30B to communicate with the port 30D so that the hydraulic pressure is supplied to the front hydraulic line from the pressure regulator valve 31, thereby releasing the lock-up clutch LC. It will thus be appreciated that in the D-1, II-1, and L-1 modes wherein no pressure is applied to the pressure chamber 30S of the lock-up control valve 30, the lock-up clutch LC is released.

To engage the lock-up clutch LC, the hydraulic pressure is, as shown in FIG. 10, supplied to the pressure chamber 30S of the lock-up control valve 30 to displace the spool 30X in the right direction, causing the port 30C to communicate with the port 30D. Under this condition, when the normally-open solenoid valve 16 is energized, it will cause the hydraulic pressure in the front hydraulic line LF of the lock-up clutch LC is drained to the reservoir tank 40 through the lock-up control valve 30 and the solenoid valve 16 so that the lock-up clutch LC is engaged. The lock-up clutch LC is so controlled as to switch between engagement and disengagement modes according to a given schedule based on a vehicle speed and a throttle valve opening degree monitored by the seed sensor 600 and the throttle valve sensor 500.

Fail-safe Control

When all the solenoid valves electrically malfunction, the solenoid valve controller 400 stops energizing them. This will cause the normally closed solenoid valves 11 and 15 to establish fluid communications between the control port 11C and the return port 11R and between the control port 15C and the return port 15R, respectively. Additionally, in the normally open solenoid valves 12, 13, 14, and 16, the pressure ports 12P, 13P, 14P, and 16P communicate with the control ports 12C, 13C, 14C, and 16C, respectively. These operative conditions are identical with those both in the O/D mode of the D range and in the II-3 mode of the II range. Thus, the shifting the shift lever to the D or II range makes it possible to travel in the O/D or II-3 mode.

Additionally, when the shift lever is shifted to the L range, the line pressure is supplied from the control port 13C of the solenoid valve 13 to the port 21A of the directional control valve 21 through the directional control valve 25, however, it is blocked at the port 21A since the spool 21A is displaced left by the elevated pressure in the pressure chamber 21A to close the port 21A with fluid communication between the ports 21B and 21D being established. The pressure in the second brake B2 is, therefore, drained to the reservoir tank 40 through the directional control valve 21, so that the forward clutch C1, the overdrive clutch C0, and the second brake B3 are activated to establish the L-1 mode in the L rage.

Accordingly, even when a failure is detected in any of the solenoid valves and the solenoid valve controller 400 deenergize all the solenoid valves, the O/D, II-3, or L-1 mode is established as long as the shift lever is shifted to one of the D, II, and L ranges. In addition, since the solenoid valve 16 is, as mentioned above, of a normally open type, when it is turned off upon occurrence of failure, the line pressure is supplied to the front hydraulic line LF of the lock-up clutch LC to inhibit engagement of the lock-up clutch LC.

A system operation in the event of any of the solenoid valves being stuck due to some contaminant will be described below.

When the solenoid valve 11 is stuck while fluid communication between the pressure port 11P and the control port 11C is established, in the D range, the line pressure from the output port 32D of the manual valve 32 is supplied to the overdrive clutch C0 through the solenoid valve 11 and the directional control valves 28 and 27, and is also supplied to the pressure chamber 25S of the directional control valve 25 to displace the spool 25X in the right direction. This causes pressure in the overdrive brake B0 to be released to the reservoir tank 40. Thus, the D-3 mode is provided even in the O/D mode. In other modes, a desired gear ratio is established.

When the solenoid valve 11 is stuck while connecting the control port 11P with the return port 11R, in the D range, the hydraulic pressure in the overdrive clutch C0 is drained to the reservoir tank 40 through the solenoid valve 11. In addition, the pressure in the pressure chamber 25S of the directional control valve 25 is also released to the reservoir tank 40, urging the spool 25X to the left to establish fluid communication between the ports 25C and 25F. This provides the O/D mode when the D-3 mode should be established. Additionally, in the D-2 and D-1 modes, the power train 200, although not meeting the operative conditions shown in Table 1, can provide 2nd and 3rd gear ratios. In other modes, a desired gear ratio is obtained.

When the solenoid valve 12 is stuck while fluid communication between the pressure port 12P and the control port 12C is established, in the D and II ranges, the line pressure from the control port 12C reaches the port 23B of the directional control valve 23. When the hydraulic pressure is not applied to the pressure chamber 23S of the directional control valve 23, the spool 23X is in the rightmost position to close the port 23B. Thus, the power train 200 provides the D-3 mode when the D-2 mode should be established and the II-3 mode when the II-2 mode should be established. In other modes, a desired gear ratio is provided.

When the solenoid valve 12 is stuck while connecting the control port 12P with the return port 12R, in the D range, the hydraulic pressure in the direct clutch C2 is released to the reservoir tank 40 through the solenoid valve 12. Therefore, the D-2 mode and the II-2 mode are established in the D-3 mode and the II-3 mode, respectively. In the O/D mode, the forward clutch C1, the overdrive brake B0, and the second brake B2 are pressurized for engagement, and the power train 200, although not meeting the operative conditions shown in Table 1, can provide 2nd and 3rd gear ratios. In other modes, a desired gear ratio is obtained.

When the solenoid valve 13 is stuck while fluid communication between the pressure port 13P and the control port 13C is established, the line pressure from the control port 13C reaches the port 25D of the directional control valve 25. When no pressure is applied to the overdrive clutch C0, that is, when no pressure acts on the pressure chamber 25S of the directional control valve 25, the spool 25X is displaced left to block the port 25D. In addition, when the hydraulic pressure is applied to the first and reverse brake B3, or when the hydraulic pressure reaches the pressure chamber 21S of the directional control valve 21 to block the port 21A, the hydraulic pressure reaching the port 21A is not supplied to the second brake B2. Further, the hydraulic pressure reaching the port 26C of the directional control valve 26 is not also supplied to the second coast brake B1 since in the D range, the spool 26X is constantly urged right so as to block fluid communication between the ports 26C and 26F. Therefore, the D-2, II-2, and L-2 modes are provided in the D-1, II-1, and L-1 modes, respectively. In other modes, a desired gear ratio is obtained.

When the solenoid valve 13 is stuck while it establishes fluid communication between the control port 13P and the return port 13R, in the O/D mode, since the directional control valve 25 establishes fluid communication between the ports 25F and 25C to provide the hydraulic pressure to the second brake B2, the D-3 mode is provided. In the D-2, the D-1 mode is established, In II-3 and I1-2 modes, the II-1 mode is established. In the L-2 mode, the L-1 mode is established. In other modes, a desired gear ratio is provided.

When the solenoid valve 14 is stuck while establishing fluid communication between the pressure port 14P and the control port 14C, it delivers no pressure in the D range since the line pressure is not applied to the port 14P. In the II and L ranges, the hydraulic pressure outputted from the control port 14P of the solenoid valve 14 reaches the port 28B of the directional control valve 28, however, it is blocked in the L range since the spool 28X is displaced in the right direction to close the port 28B. Additionally, the line pressure from the solenoid valve 14 is also supplied to the port 24B of the directional control valve 24, however, it is blocked here in the II range since the spool 24X is moved in the right direction to close the port 24B. Therefore, in all the modes, a desired gear ratio is established.

When the solenoid valve 14 is stuck while connecting the control port 14P with the return port 14R, in the II range, the hydraulic pressure in the overdrive clutch C0 is released to the reservoir tank 40 concurrent with reduction in pressure in the pressure chamber 25S of the directional control valve 25, causing the spool 25X to move in the left direction for establishing fluid communication between the ports 25C and 25F. This causes the overdrive brake B0 and the second brake B2 to be activated. Therefore, in the II range, the O/D mode is provided all the time. In the L-1 mode, the D-1 mode is established. In other modes, a desired gear ratio is provided.

While the present invention has been disclosed in terms of the preferred embodiment in order to facilitate better understanding hereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A hydraulic control system for an automatic transmission of a vehicle, the automatic transmission including a power train having a plurality of frictional elements which are selectively brought into engagement and disengagement by a hydraulic pressure input according to an operation schedule for establishing a desired gear ratio, the hydraulic control system comprising:

a hydraulic pressure source constructed and arranged to provide a hydraulic pressure;

a hydraulic circuit constructed and arranged to supply said hydraulic pressure from said hydraulic pressure source to the plurality of the frictional elements in the automatic transmission;

a plurality of first solenoid valves disposed in said hydraulic circuit between said hydraulic pressure source and the frictional elements, each solenoid valve having a pressure input, a pressure output, and pressure drain ports, each first solenoid valve being constructed and arranged to operate between first and second valve positions, wherein said pressure input is supplied by said hydraulic pressure from said hydraulic pressure source, said first valve position establishing fluid communication between said pressure input and pressure output so that said hydraulic pressure is output from said pressure output, said second valve position establishing fluid communication between said pressure output and said pressure drain port;

a plurality of directional control valves connected to said hydraulic pressure source, each directional control valve operating between first and second directional control valve positions in response to said hydraulic pressure supplied from said hydraulic pressure source, said first directional control valve position establishing fluid communication between one of the frictional elements and one of said pressure outputs, said second directional control valve position being such that said hydraulic pressure acting on the one of the frictional elements is relieved;

valve controlling means for switching said first solenoid valves between said first and second valve positions according to the operation schedule for establishing the desired gear ratio; and pressure regulator means for temporarily reducing said hydraulic pressure provided to the frictional elements upon an initial application of said hydraulic pressure to the frictional elements, said pressure regulator means comprising a pressure regulator valve and a second solenoid valve, said pressure regulator valve being responsive to an input pressure so as to temporarily reduce said hydraulic pressure, said second solenoid valve modifying said input pressure to temporarily reduce said hydraulic pressure supplied to the frictional elements, upon the initial engagement of the frictional elements.

2. A hydraulic control system as set forth in claim 1, wherein at least one of said directional control valves assumes one of said first and second directional control valve positions in accordance with said hydraulic pressure supplied through one of said solenoid valves.

3. A hydraulic control valve system as set forth in claim 1, further comprising a manually operated valve, wherein at least one of said directional control valves assumes one of said first and second directional control valve positions according to a pressure level of said hydraulic pressure supplied from said hydraulic pressure source through said manually operated valve.

* * * * *